(12) United States Patent
Yokoo

(10) Patent No.: US 7,134,791 B2
(45) Date of Patent: Nov. 14, 2006

(54) DYNAMIC PRESSURE BEARING DEVICE, SPINDLE MOTOR, DISK DRIVE DEVICE, AND METHOD OF MANUFACTURING DYNAMIC PRESSURE BEARING DEVICE

(76) Inventor: Yoshinari Yokoo, 14616-536, Akaho, Komagane-shi Nagano (JP) 399-4117

( * ) Notice: Subject to any disclaimer, the term of this patent is extended or adjusted under 35 U.S.C. 154(b) by 100 days.

(21) Appl. No.: 10/522,442

(22) PCT Filed: Jul. 18, 2003

(86) PCT No.: PCT/JP03/09141

§ 371 (c)(1),
(2), (4) Date: Jan. 18, 2005

(87) PCT Pub. No.: WO2004/010014

PCT Pub. Date: Jan. 29, 2004

(65) Prior Publication Data

US 2005/0249440 A1   Nov. 10, 2005

(30) Foreign Application Priority Data

Jul. 18, 2002 (JP) ............................. 2002-210135
Dec. 3, 2002 (JP) ............................. 2002-350855
Dec. 26, 2002 (JP) ............................. 2002-377238

(51) Int. Cl.
*F16C 17/10* (2006.01)

(52) U.S. Cl. .................................... 384/107; 384/121
(58) Field of Classification Search ................ 384/107, 384/114, 115, 119, 121
See application file for complete search history.

(56) References Cited

U.S. PATENT DOCUMENTS 6,010,246 A * 1/2000 Gomyo et al. .............. 384/115
2002/0074880 A1   6/2002 Young

FOREIGN PATENT DOCUMENTS

| JP | 2001-254732 | 2/2000 |
| JP | 2001-289242 | 4/2000 |
| JP | 2002-005173 | 6/2000 |
| JP | 2002-018543 | 6/2000 |
| JP | 2002-147443 | 11/2000 |
| JP | 2002-084727 | 2/2002 |
| WO | WO/75522 | 6/2000 |

* cited by examiner

*Primary Examiner*—Lenard A. Footland
(74) *Attorney, Agent, or Firm*—Mark Montague; Cowan Liebowitz & Latman, P.C.

(57) ABSTRACT

A dynamic pressure bearing device and a spindle motor used for a magnetic disk drive device capable of increasing an impact resistance, reducing A-PRO (oscillating motion of shaft), reducing a variation in rigidity of bearings against a variation in temperature, suppressing a current loss, and reducing a size and a thickness.

17 Claims, 16 Drawing Sheets

( CHANGES IN OIL VISCOCITY WITH TEMPERATURE CHANGES )

Fig. 10

CHANGES IN GAP WITH TEMPERATURE CHANGES (SHAFT WITH DIAMETER OF 3mm)

| SHAFT MATERIAL COEFFICIENT OF LINER EXPANSION (×10⁻⁶) | | SUS-300 TYPE 17.3 | SUS-400 TYPE 10.3 | ALUMIUM ALLOY OF PRESENT INVENTION 14.0 | BsBm 19.1 | Bronze 17.8 |
|---|---|---|---|---|---|---|
| SLEEVE MATERIAL | TEMPERATURE | | | | | |
| SUS-300 TYPE 17.3 | 0 | 0 | -0.4 | -0.2 | 0.1 | 0 |
| | 20 | 0 | 0 | 0 | 0 | 0 |
| | 40 | 0 | 0.4 | 0.2 | -0.1 | 0 |
| | 60 | 0 | 0.8 | 0.4 | -0.2 | 0 |
| | 80 | 0 | 1.3 | 0.6 | -0.3 | -0.1 |
| | 100 | 0 | 1.7 | 0.8 | -0.4 | -0.1 |
| SUS-400 TYPE 10.3 | 0 | 0.4 | 0 | 0.2 | 0.5 | 0.5 |
| | 20 | 0 | 0 | 0 | 0 | 0 |
| | 40 | -0.4 | 0 | -0.2 | -0.5 | -0.5 |
| | 60 | -0.8 | 0 | -0.4 | -1.1 | -0.9 |
| | 80 | -1.3 | 0 | -0.7 | -1.6 | -1.4 |
| | 100 | -1.7 | 0 | -0.9 | -2.1 | -1.8 |
| ALUMIUM ALLOY OF PRESENT INVENTION 14.0 | 0 | 0.2 | -0.2 | 0 | 0.3 | 0.2 |
| | 20 | 0 | 0 | 0 | 0 | 0 |
| | 40 | -0.2 | 0.2 | 0 | -0.3 | -0.2 |
| | 60 | -0.4 | 0.4 | 0 | -0.6 | -0.5 |
| | 80 | -0.6 | 0.7 | 0 | -0.9 | -0.7 |
| | 100 | -0.8 | 0.9 | 0 | -1.2 | -0.9 |
| BsBm 19.1 | 0 | -0.1 | -0.5 | -0.3 | 0 | -0.1 |
| | 20 | 0 | 0 | 0 | 0 | 0 |
| | 40 | 0.1 | 0.5 | 0.3 | 0 | 0.1 |
| | 60 | 0.2 | 1.1 | 0.6 | 0 | 0.2 |
| | 80 | 0.3 | 1.6 | 0.9 | 0 | 0.2 |
| | 100 | 0.4 | 2.1 | 1.2 | 0 | 0.3 |
| Bronze 17.8 | 0 | 0 | -0.4 | -0.2 | 0 | 0 |
| | 20 | 0 | 0 | 0 | 0 | 0 |
| | 40 | 0 | 0.4 | 0.2 | 0 | 0 |
| | 60 | 0.1 | 0.9 | 0.5 | -0.1 | 0 |
| | 80 | 0.1 | 1.4 | 0.7 | -0.2 | 0 |
| | 100 | 0.1 | 1.8 | 0.9 | -0.3 | 0 |

※ VALUES IN TABLE ARE IN $\mu m$ (A)

(B)

US 7,134,791 B2

DYNAMIC PRESSURE BEARING DEVICE, SPINDLE MOTOR, DISK DRIVE DEVICE, AND METHOD OF MANUFACTURING DYNAMIC PRESSURE BEARING DEVICE

This application is a 371 of PCT/JP03/09141 filed Jul. 18, 2003, based on JAPAN 2002-210135 filed Jul. 18, 2002, JAPAN 2002-350855 filed Dec. 3, 2002, and JAPAN 2002-377238 filed Dec. 26, 2002.

TECHNICAL FIELD

The present invention relates to a dynamic pressure bearing device, a spindle motor, a disk drive device in which the spindle motor is mounted, and a method of manufacturing a dynamic pressure bearing device, in particular, those suitable for a hard disk drive device.

BACKGROUND ART

A spindle motor is mounted in a hard disk drive mechanism (hereinafter referred to as HDD), a digital versatile disk mechanism (hereinafter referred to as DVD), a scanner device, etc., and is used to rotating a hard disk, a digital versatile disk, a mirror, etc. at high speed. High-speed rotation, high-speed rotation accuracy, power saving, calmness, high reliability, etc. are required of such a spindle motor. To meet such high-level requirements, it has become necessary to adopt a bearing of very high accuracy.

As such a bearing, a ball bearing has conventionally been used; recently, however, a dynamic pressure fluid bearing has come to be used. Due to its principle, a dynamic pressure fluid bearing has properties basically enabling it to meet the above requirements, and is suitable for use in a spindle motor. However, to utilize its superior properties, it is necessary to take into account various conditions in terms of structure and application to apparatuses. That is, in a dynamic pressure fluid bearing, the shaft and the bearing are supported in a non-contact state by an oil pressure generated by relative rotation. Here, from the viewpoint of fluid mechanics theory, to maintain a predetermined pressure, it is necessary to control very strictly the gap, oil viscosity, accuracy in configuration, such as squareness, etc., and, further, a special contrivance is needed for preventing fine variation due to changes in temperature and changes with passage of time.

In the following, the constructions of conventional dynamic pressure bearing devices and conventional spindle motors with various contrivances are shown. Two types of spindle motor are known: a shaft fixing type in which the shaft is fixed, as shown in FIG. 4 of Patent Document 1 (JP 8-335366 A) and Patent Document 2 (JP 2000-41359 A); and a shaft rotating type in which the shaft rotates with the rotor, as shown in FIG. 1 of Patent Document 1 and Patent Document 3 (JP 2000-324753 A). First, a conventional shaft fixing type spindle motor 100 will be described with reference to FIG. 19.

In the spindle motor 100, a shaft 102 is press-fitted for fixation into a base 101, and a thrust plate 103 is press-fitted for fixation into the distal end portion of the shaft 102. In the outer periphery of the cylindrical portion at the center of the base 101, there is arranged a core 104 consisting of a plurality of thin magnetic metal plates whose central hole portions are fitted onto the cylindrical portion. A plurality of radially extending salient poles are arranged on the core 104 at predetermined intervals, and coil windings 105 are provided on the salient poles. The base 101, the core 104, and the coil windings 105 form the stator of the spindle motor 100.

In the periphery of the shaft 102, there is arranged a cylindrical sleeve 111 serving as a bearing, and a counter plate 112 is fixed onto the sleeve 111 so as to close the central hole (the upper portion as seen in FIG. 19) of the sleeve 111. A cylindrical hub 114 on which a disk 113, such as a hard disk, is to be placed is fixed to the outer periphery of the sleeve 111 by press-fitting, shrinkage fit, adhesion, etc.

A cylindrical magnet 116 is fixed to the inner peripheral portion of the cylindrical portion of the hub 114 through the intermediation of a metal cylindrical yoke 115 constituting a magnetic member. The hub 114 is equipped with a screw hole through which there a screw 117 for attaching and detaching the disk 113 is passed. And, the disk 113 is held between a damper 118 and the hub 114, and then, while passing the screw 117 through the screw hole, the screw 117 is fastened, whereby the disk 113 can be fixed to the hub 114. The sleeve 111, the counter plate 112, the hub 114, the yoke 115, and the magnet 116 constitute the rotor of the spindle motor 100.

Oil is introduced into the slight gap between the shaft 102 (inclusive of the thrust plate 103) and the sleeve 111, and the oil is maintained therein so as not to leak to the exterior of the sleeve 111. In one end portion of the inner peripheral surface of the sleeve 111, there is provided a radial dynamic pressure groove 121 for regulating the radial movement of the shaft 102, and also in the other end portion of the inner peripheral surface, a radial dynamic pressure groove 122 is provided. In the surface of the thrust plate 103 opposed to the counter plate 112, there is provided a thrust dynamic pressure groove for regulating the movement of the rotor in the thrust direction, and in the surface of the thrust plate 103 opposed to a step portion 123 of the sleeve, there is provided a similar thrust dynamic pressure groove.

Next, the construction of a conventional shaft rotating type spindle motor 200 will be described with reference to FIG. 20.

In the spindle motor 200, a cylindrical sleeve 202 is press-fitted for fixation into the central portion of a base 201, and a counter plate 203 is fixed onto the sleeve 202 so as to close the central hole of the sleeve 202. In the outer periphery of the sleeve 202, there is arranged a core 204 formed by stacking together thin magnetic metal plates, and a coil winding 205 is provided on a salient pole portion. The base 201, the sleeve 202 (inclusive of the counter plate 203), the core 204, and the coil winding 205 constitute the stator of the spindle motor 200.

Inserted into the sleeve 202 is a shaft 212 bonded to a hub 211, and a thrust plate 213 is press-fitted for fixation into the forward end portion of the shaft 212. A cylindrical magnet 215 is fixed to the hub 211 through the intermediation of a cylindrical yoke 214. The shaft 212 is equipped with a screw recess constituting a screw portion for screw-engagement of a screw 217 allowing mounting of a disk 216, such as a versatile disk.

The disk 216 is held between the damper 218 and the hub 211, and then the screw 217 is inserted into the screw recess, and the screw 217 is fastened, whereby the disk 216 can be mounted to the hub 211. Here, the hub 211, the shaft 212, the thrust plate 213, the yoke 214, and the magnet 215 constitute the rotor of the spindle motor 200.

Oil is introduced into the slight gap between the sleeve 202 and the shaft 212, and the oil is maintained so as not to leak to the exterior of the sleeve 202. A pair of radial dynamic pressure grooves 221 and 222 are provided respectively in one end portion and the other end portion of the inner peripheral surface of the sleeve 202. Thrust dynamic pressure grooves are provided in the surface of the thrust plate 213 opposed to the counter plate 203 and in the surface thereof opposed to a step portion 223 of the sleeve 202.

The conventional fixing type spindle motor 100 and the shaft rotating type spindle motor 200 have the following five serious problems. The first problem lies in the fact that, in the conventional spindle motors 100 and 200, the portions making relative rotation are formed by a combination of separate components, so that they are rather vulnerable to impacts.

The second problem lies in the fact that, in the conventional spindle motors 100 and 200, the verticality between the shaft 102, 212 and the rotor is rather insufficient, resulting in an increase in runout at the hub 114, 211. This runout is of two categories: repeatable runout (hereinafter referred to as RRO), and non-repeatable runout (hereinafter referred to as NRRO). Further, there are axial runout and planar runout; in the conventional spindle motors 100 and 200, the axial RRO (hereinafter referred to as A-RRO) is large. When the A-RRO of the hub 114, 211 increases, the planar RRO in the plane of the disk 113, 216 increases, resulting in generation of errors in terms of information recording on the disk 113, 216 and information reading from the disk 113, 216.

It is to be assumed that the increase in A-RRO in the conventional spindle motor 100, 200 is attributable to the following circumstance: in the case of the spindle motor 100, the fixing portion 100a of the sleeve 111 and the hub 114 is fixed by press-fitting, shrinkage fit, adhesion, etc.; when such a method is adopted, generation of a deviation of the hub 114 with respect to the sleeve 111 in terms of design accuracy cannot be helped. Such a deviation is also generated during assembly; further, there remains a mounting stress in the fixing portion 100a, resulting in generation of a deviation in accuracy due to temperature changes and changes with passage of time. This deviation in accuracy results in a deterioration in verticality, which directly leads to a deterioration in A-RRO.

In the case of the spindle motor 200, the diameter of the shaft 212 is small, and the contact width of the fixing portion 200a of the shaft 212 and the hub 211 is small, so that it is very difficult to control the perpendicularity at the fixing portion 200a with high accuracy, and it is quite impossible to maintain the requisite perpendicularity (verticality). Further, even if a desired perpendicularity is attained during assembly, the fixation of the shaft 212 and the hub 211 is effected by press-fitting, adhesion, etc., so that, as in the case of the sleeve 111 and the hub 114 of the spindle motor 100, a mounting stress remains, which means it is impossible to maintain the requisite perpendicularity due to temperature changes and changes with passage of time. The state where the requisite perpendicularity cannot be attained directly leads to a deterioration in A-RRO.

In both the spindle motors 100 and 200, there is generated a slight inclination of the thrust plate 103, 213 with respect to the shaft 102, 212 during the assembly of the shaft 102 and the thrust plate 103 and the assembly of the shaft 212 and the thrust plate 213. This inclination (deterioration in verticality) causes a deterioration in the A-RRO of the hub 114, 211.

The third problem lies in the fact that, in the conventional spindle motors 100 and 200, the variation in the rigidity of the bearing with respect to temperature changes is large. When the bearing rigidity is excessively reduced, the repeatable runout (RRO) and the non-repeatable runout (NRRO) increase, making it impossible for the motor to be used as such.

It is to be assumed that the great variation (reduction) in bearing rigidity with respect to temperature changes in the conventional spindle motors 100 and 200 is attributable to the following fact: in the conventional spindle motors 100 and 200, the material of the shaft 102, 212 is a 400 type stainless steel (SUS 400 type), for example, SUS430 containing 18% of Cr, and the material of the sleeve 111, 202 is brass or a 300 type stainless steel (SUS 300 type), for example, SUS304 containing 18% or Cr and 8% of Ni. When these materials are adopted, due to the influence of a difference in coefficient of linear expansion, the gap between the shaft 102 and the sleeve 111 or the gap between the shaft 212 and the sleeve 202 is enlarged when the temperature rises, resulting in a deterioration in dynamic pressure effect and a reduction in the bearing rigidity in the radial direction. Further, when the temperature rises, the viscosity of the oil for dynamic pressure decreases, resulting in a further reduction in the rigidity of the bearing.

In the case of SUS430 and SUS304 mentioned above, the coefficient of linear expansion of SUS430, which is relatively hard, is $10.4 \times 10^{-6}$, and the coefficient of linear expansion of SUS304, which is relatively soft, is $10.4 \times 10^{-6}$; thus, when the temperature rises, the sleeve 111, 202 expands to a greater degree, and the gap between it and the shaft 102, 212 is enlarged. It should be noted that the problem regarding bearing rigidity occurs not only in the radial direction but also in the thrust direction for the same reason as mentioned above.

It might be possible to solve this problem regarding bearing rigidity by forming the sleeve 111, 202 of the same material as that of the shaft 102, 212, i.e., SUS 400 type (No influence due to a difference in coefficient of linear expansion is generated); however, the sleeve 111, 202 would then become rather hard, so that machining thereon, such as grooving and shaping, is rather difficult to perform, resulting in a substantial reduction in productivity and an increase in production cost. Further, regarding the variation in oil viscosity with temperature rise in the bearing portion, no improvement is to be achieved, which means the problem still persists.

Theoretically, it might be possible for the material of the shaft 102, 212 to be the same as that of the sleeve 111, 202, i.e., SUS-300 type. However, if the shaft 102, 212 were formed of the same material as that of the sleeve 111, 202, which is rather soft, the shaft 102, 212 would be susceptible to damage, and the stability in rotation would be likely to be impaired; further, locking would be likely to occur between the shaft 102, 212 and the sleeve 111, 202, so that this idea cannot be adopted.

Apart from this, it might be possible to form the shaft 102, 212 of SUS-300 type and the sleeve 111, 202 of SUS-400 type; however, if the sleeve 111, 202 were formed of SUS-400 type, the difference in thermal expansion would become excessive, so that the shaft 102, 212 would be locked at high temperature. That is, due to its small coefficient of thermal expansion, the gap between the shaft 102, 212 and the sleeve 111, 202 would be reduced to zero at high temperature, resulting in a locked state. Further, in some cases, a reduction in the size of the gap would cause the shaft 102, 212 to hit the sleeve 111, 202 formed of SUS-400 type, which is hard, resulting in the shaft 102, 212 suffering damage.

Further, if the shaft 102, 212 were formed of SUS-300 type, and the sleeve 111, 202 were formed of SUS-400 type, due to the high hardness of SUS-400 type, it would be difficult to perform high precision machining and dynamic pressure groove machining, such as attaining dimensional accuracy for the inner diameter, circularity, fine surface roughness, and highly accurate cylinder formation. A variation in the inner diameter dimension makes it impossible to obtain an appropriate gap, making it necessary to perform a process of selective combination through measurement, which requires a great amount of time. This leads to a problem in terms of productivity and cost. Difficulty in the dynamic pressure groove machining will directly lead to a deterioration in the uniformity and symmetry in the groove depth, resulting in a deterioration in bearing property. Further, this will also adversely affect the productivity and price.

For the above reasons, it is substantially impossible to adopt the combination, either, in which the shaft 102, 212 is formed of SUS-300 type and the sleeve 111, 202 of SUS-400.

The fourth problem lies in the fact that, in the conventional spindle motors 100 and 200, the current loss is large. It is to be assumed that this is attributable to two factors, one of which is a structural factor. That is, to achieve the requisite strength and efficient operability for the fixing portion 100a of the sleeve 111 and the hub 114 of the shaft fixing type spindle motor 100 shown in FIG. 19, it is necessary to increase the axial length of the fixing portion 100a, and to make the radial wall thickness of each component sufficiently large; as a result, the space for accommodating the core 104 and the coil winding 105 is rather small, with the result that the electromagnetic characteristic (Kt) is rather low. This tendency toward a reduction in the accommodating space and electromagnetic characteristic is also involved in the shaft rotating type spindle motor 200.

The other factor leading to a large current loss is a problem regarding the bearing structure. That is, the shaft loss torque in the bearing portion can be mitigated without involving a reduction in bearing rigidity by reducing the diameter of the shaft 102, 212, and reducing the radial gap. However, in the case of the spindle motor 100, when the diameter of the shaft 102 is reduced, it becomes rather difficult to achieve the requisite connection force and perpendicularity in the fixing portion 100b of the shaft 102 and the base 101. Further, in the case of the spindle motor 200, when the diameter of the shaft 212 is reduced, the contact area in the fixing portion 200a of the shaft 212 and the hub 211 is further reduced, resulting in a further deterioration in A-RRO as described above. Further, when the radial gap is reduced, the influence of the difference in coefficient of linear expansion becomes rather conspicuous.

One of the factors leading to an increase in current loss is a problem regarding the thickness of the thrust plate 103, 213. Under the circumstances, to obtain the requisite perpendicularity of the thrust plate 103, 213 and the requisite fixing strength at the fixing portion 100c, 200b, there is no other alternative but to increase the thickness of the thrust plate 103, 213. More specifically, the thickness of the thrust plate 103, 213 is set to approximately 1 to 1.5 mm. As a result, the current loss is considerably large.

In this way, it is very difficult to reduce the diameter of the shaft 102, 212 or the thickness of the thrust plate 103, 213, and this causes an increase in current and an increase in current loss.

The fifth problem lies in the fact that while the conventional spindle motors 100 and 200 can easily conform to a 3.5 inch hard disk, it is difficult for them to conform to a 2.5 inch or 1.8 inch hard disk, which is still smaller and thinner.

That is, in the conventional spindle motors 100 and 200, the portion making relative rotation is an assembled component obtained by assembling separate members, so that it is rather difficult to control the gap of the bearing portion, and the gap cannot but be rather large, making it difficult to achieve a reduction in size and thickness. In particular, taking into account the strength and accuracy of the assembly, the thickness of the thrust plate 103, 213 and that of the hub 114, 211 cannot but be large, resulting in a rather large axial thickness.

Further, with the recent requirement for ultra-miniaturization of disk drive devices, there is a demand for a spindle motor and a dynamic pressure bearing device in which the diameter of the sleeve portion is 3 mm or less. In forming radial dynamic pressure grooves in such an ultrasmall sleeve, the conventionally adopted three methods, i.e., electrolytic processing, the rotary type ball rolling with mandrel rotation, and the stationary type ball rolling without mandrel rotation, are becoming no longer applicable from the viewpoint of sleeve material, etc.

The present invention has been made with a view toward solving the above problems. It is an object of the present invention to provide a dynamic pressure bearing device, a spindle motor, a disk drive device with a spindle motor, and a method of manufacturing a dynamic pressure bearing device in which it is possible to achieve an improvement in impact resistance, a reduction in A-RRO (so-called shaft oscillating motion), a reduction in variation bearing rigidity with respect to temperature changes, minimization of current loss, and a reduction in size and thickness.

Another object of the present invention is to provide a dynamic pressure bearing device, a spindle motor, a disk drive device with a spindle motor, and a method of manufacturing a dynamic pressure bearing device which help to achieve at least part of the above-mentioned characteristics.

Still another object of the present invention is to provide a method of manufacturing a dynamic pressure bearing device in which, even if a reduction in thickness is achieved, it is possible to maintain the verticality of the shaft with respect to the base and in which, even if the diameter of the shaft is as small as approximately 0.6 to 3 mm, it is possible to form grooves in the inner surface of the sleeve easily and at low cost.

SUMMARY OF THE INVENTION

To attain the above objects, a dynamic pressure bearing device according to the present invention relates to a dynamic pressure bearing device including a base, a shaft fixed to the base, and a sleeve rotatably arranged around the shaft, in which: a circular thrust plate, which is provided on the shaft and has a diameter larger than that of the shaft portion, and the shaft are formed integrally of a stainless steel into a shaft member; the sleeve is formed of an aluminum silicon alloy containing aluminum and silicon as components, the sleeve having an inner diameter ranging from 0.6 to 3 mm; the shaft member has a coefficient of linear expansion of $17 \times 10^{-6} \pm 5\%$; the sleeve has a coefficient of linear expansion of $14 \times 10^{-6} \pm 5\%$ as measured in a measurement range of 0° C. to 100° C.; the thrust plate portion has an axial thickness of 0.15 to 0.35 mm; a hardness of the sleeve is lower than that of the shaft, with a radial bearing dynamic pressure groove being provided in a portion of the sleeve, which is a softer member, opposed to the shaft; and a counter plate is provided at a position opposed to the thrust plate so as to cover the thrust plate and to close a central hole of the sleeve, a first thrust dynamic pressure groove for a thrust bearing is provided at a position of the counter plate opposed to the thrust plate, and a second thrust dynamic pressure groove is provided in a portion of the sleeve opposed to a surface opposite to the surface of the thrust plate opposed to the first thrust dynamic pressure groove.

In the dynamic pressure bearing device of this invention, the shaft fixed to the base and the thrust plate are integrated into an integral member, whereby an improvement in impact resistance is achieved, and the requisite verticality is easy to obtain. Thus, it is possible to reduce the A-RRO of the sleeve, which rotates relative to the shaft. Further, the respective coefficients of linear expansion of the sleeve and the shaft member are predetermined ones of which the shaft member side one is larger, whereby the variation in bearing rigidity with respect to temperature changes is reduced. Further, the rotary sleeve is formed of an aluminum silicon alloy containing aluminum and silicon, so that its mass is approximately the same as that of aluminum, thus achieving a reduction in current loss and inertia. Further, due to the adoption of an aluminum silicon alloy, it is possible to use the ball rolling system without mandrel rotation in forming grooves in the inner peripheral surface of the sleeve, whereby it is possible to produce an ultrasmall dynamic pressure bearing device whose sleeve inner diameter is 0.6 to 3 mm with a stable quality and at low cost.

Further, since this dynamic pressure bearing device is of the shaft fixing type, it allows incorporation of this shaft member even if the diameter of the thrust plate is larger than the shaft diameter. Further, the dynamic pressure groove for the radial bearing is provided on the sleeve side, where the hardness is lower, so that, as in the case of the conventional brass sleeve, it is possible to form the dynamic pressure groove inside the sleeve easily by ball rolling without involving generation of cracks; further, due to the protruding portion provided in the dynamic pressure groove portion (which is a step portion that is often provided on the sleeve surface so as to protrude toward the center prior to the formation of the dynamic pressure grooves), it is possible to prevent the shaft surface from being damaged. Further, the sleeve is formed of a material softer than that of the shaft member, so that, when inserting the shaft member into the sleeve, the shaft suffers no damage if they come into contact with each other, thereby making it possible to secure a stable performance over a long period of time.

Further, since the axial thickness of the thrust plate portion is set to 0.15 to 0.35 mm, the current loss is reduced, and it is possible to achieve a reduction in size and thickness. Further, the dynamic pressure groove for the thrust bearing is provided in the counter plate opposed to the thrust plate and in the sleeve, so that, as compared to the case in which the dynamic pressure groove is provided in the thrust plate, whose area is apt to be rather small, the degree of freedom is increased in terms of the position of the dynamic pressure groove and design, whereby it is possible to obtain a more appropriate dynamic pressure effect and to achieve a reduction in cost.

A dynamic pressure bearing device according to another aspect of the invention includes a shaft, a sleeve arranged around the shaft so as to be capable of relative rotation, and a base fixing one of the base and the sleeve; that is, it is intended for both the shaft fixing type and the shaft rotating type, and its construction is partially modified from that of the device according to the above aspect of the invention.

For example, by making the respective coefficients of linear expansion of the sleeve and the shaft member predetermined ones, with that of the shaft member being much larger, the variation in bearing rigidity with respect to temperature changes is diminished. By thus partially modifying the construction, it is possible to achieve part of the effects of the above-described invention and some other effects.

More specifically, when the sleeve is formed of an aluminum silicon alloy containing aluminum and silicon in which, at least within the temperature range of 0° C. to 100° C., the higher the temperature, the larger its coefficient of linear expansion, and when the coefficient of linear expansion of the shaft is made larger than the coefficient of linear expansion of the integral member and constant within the above temperature range, the gap of the dynamic pressure grooves within the sleeve is diminished with an increase in temperature, and it is possible to substantially reduce the danger of the sleeve and the shaft coming into contact with each other. Here, the constant coefficient of linear expansion is not restricted to one undergoing no change at all but includes one in which the change is approximately one fifth or less as compared with that in the aluminum silicon alloy.

Further, due to the adoption of an aluminum silicon alloy, when the sleeve inner diameter is within the range of 0.6 to 3 mm, even in the case of such a very small sleeve diameter, it is possible to apply the ball rolling system without mandrel rotation to the formation of grooves in the sleeve inner peripheral surface. As a result, it is possible to obtain a dynamic bearing device of a stable quality at low cost.

To attain the above-mentioned objects, a spindle motor according to the present invention relates to a spindle motor including a base, a shaft fixed to the base, a sleeve rotatably arranged around the shaft, a hub or a rotor adapted to rotate integrally with the sleeve, and a stator fixed to the base, in which: a circular thrust plate, which is provided on the shaft and has a diameter larger than that of the shaft portion, and the shaft are formed integrally of a stainless steel as a first integral member; the sleeve and the hub, or the sleeve and the rotor, are formed integrally as a second integral member of an aluminum silicon alloy containing aluminum and silicon as components, the sleeve having an inner diameter ranging from 0.6 to 3 mm; the first integral member has a coefficient of linear expansion of $17 \times 10^{-6} \pm 5\%$; the second integral member has a coefficient of linear expansion of $14 \times 10^{-6} \pm 5\%$ as measured in a measurement range of 0° C. to 100° C.; the second integral member has a lower hardness than the first integral member, with a radial bearing dynamic pressure groove being provided in a portion of the second integral member, constituting a softer member, opposed to the shaft; and a counter plate is provided at a position opposed to the thrust plate so as to cover the thrust plate and to close a central hole of the sleeve, a first thrust dynamic pressure groove for a thrust bearing is provided at a position of the counter plate opposed to the thrust plate, and a second thrust dynamic pressure groove is provided in a portion of the sleeve opposed to a surface opposite to the surface of the thrust plate opposed to the first thrust dynamic pressure groove.

In the spindle motor of this invention, the two relative rotation portions are both integrated into an integral member. That is, the sleeve and hub or the sleeve and rotor are integrated into an integral member, and the shaft and the thrust plate are integrated into an integral member, so that an improvement in terms of impact resistance is achieved, and the requisite verticality can be easily obtained, thereby making it possible to make the A-RRO very small. Further, it is possible to achieve a reduction in size and thickness. Further, the respective coefficients of linear expansion of the sleeve side integral member and the shaft side integral member are predetermined ones, with that of the shaft side integral member being larger, so that the variation in bearing rigidity with temperature changes is reduced.

In addition, the sleeve and hub or the sleeve and rotor are formed of an integral member of an aluminum silicon alloy, there is no need to take into consideration the fixation of the hub to the sleeve or the fixation of the rotor to the sleeve, making it possible to ensure a sufficiently large accommodating space for the core and the coil winding and to reduce the current loss. Further, due to the adoption of the aluminum silicon alloy, it is possible to apply the ball rolling system without mandrel rotation to the formation of grooves in the sleeve inner peripheral surface, making it possible to produce an ultrasmall spindle motor whose sleeve inner diameter is as small as 0.6 to 3 mm with a stable quality and at low cost.

Further, this spindle motor is of the shaft fixing type, so that, even if the diameter of the thrust plate is larger than that of the shaft, it is possible to mount the first integral member. Further, the dynamic pressure groove for the radial bearing is provided on the sleeve side, where the hardness is lower, so that, as in the case of the conventional brass sleeve, it is possible to form the dynamic pressure groove inside the sleeve easily by ball rolling without involving generation of cracks; further, due to the protruding portion provided in the dynamic pressure groove portion (which is a step portion that is often provided on the sleeve surface so as to protrude toward the center prior to the formation of the dynamic pressure grooves), it is possible to prevent the shaft surface from being damaged. Further, the sleeve is formed of a material softer than that of the shaft, so that, when inserting the shaft into the sleeve, the shaft suffers no damage if they come into contact with each other, thereby making it possible to secure a stable performance over a long period of time.

Further, the dynamic pressure groove for the thrust bearing is provided in the counter plate opposed to the thrust plate and in the sleeve, so that, as compared to the case in which the dynamic pressure groove is provided in the thrust plate, whose area is apt to be rather small, the degree of freedom is increased in terms of the position of the dynamic pressure groove and design, whereby it is possible to obtain a more appropriate dynamic pressure effect and also to achieve a reduction in cost.

A spindle motor according to another aspect of the invention is also a shaft fixing type spindle motor, and its construction is partly modified from that of the above-described spindle motor. As a result, it is possible to obtain part of the above-mentioned effects and some other effects.

A spindle motor according to another aspect of the invention is intended for both shaft fixing type and shaft rotating type. For example, a spindle motor includes a shaft, a sleeve arranged around the shaft so as to be capable of making relative rotation, a hub or rotor adapted to rotate integrally with the sleeve or a hub or rotor adapted to rotate integrally with the shaft, a base fixing one of the sleeve and the shaft.

In the spindle motor thus constructed, the thrust plate which, for example, is a circular thrust plate provided on the shaft and which has a diameter larger than that of the shaft, is integrally formed with the shaft of stainless steel as an integral member, and the axial thickness of the thrust plate portion is set to 0.1 to 0.7 mm. In this spindle motor, the axial thickness of the thrust plate portion of the integral member is 0.1 to 0.7 mm, so that, in addition to the above effects, it is possible to further reduce the axial length of the motor while sufficiently providing the function of a thrust bearing, making it possible to achieve a further reduction in size and thickness. Further, by making the thrust plate portion thin, it is possible to achieve a reduction in current loss.

In another spindle motor, the sleeve and hub or the sleeve and rotor are formed into an integral member using an aluminum silicon alloy containing aluminum and silicon, wherein the coefficient of linear expansion of this integral member is $10 \times 10^{-6}$ to $17 \times 10^{-6}$, and hardness of the integral member is not higher than that of the shaft, and wherein a dynamic pressure groove for the radial bearing is provided in the portion formed of an equivalent or softer material and opposed to the shaft.

In this way, various modifications are made of the construction of a spindle motor inclusive of both shaft fixing type and shaft rotating type ones, thereby providing part of the above-mentioned effects and some other effects.

In another example, a spindle motor includes a shaft, a sleeve arranged around this shaft so as to be capable of making relative rotation, a hub or rotor adapted to rotate integrally with the sleeve or a hub or rotor adapted to rotate integrally with the shaft, a base fixing one of the sleeve and the shaft, wherein the sleeve is formed of an aluminum silicon alloy containing 65 to 84% by weight of Al, 15 to 32% by weight of Si, and 1 to 5% by weight of Cu, etc., and wherein the inner diameter thereof ranges from 0.6 to 3 mm.

In the spindle motor of this invention, the sleeve is formed of an aluminum alloy containing silicon within a predetermined range, so that no burr or plucking is generated even if a ball rolling system, in particular, a ball rolling system without mandrel rotation is adopted. In forming a groove by machining in a sleeve formed of a hard metal other than an aluminum silicon alloy, a ball rolling system with mandrel rotation has conventionally been adopted in order to prevent generation of burr and plucking; in the case of this system, however, a sleeve inner diameter of approximately 3 mm or more is required. In the case of an aluminum silicon alloy, in addition to its sufficient hardness, no burr or plucking is involved when ball rolling is performed, so that it is possible to adopt a ball rolling system without mandrel rotation which can conform to a sleeve diameter of 3 mm or less. As a result, it is possible to achieve stabilization in the groove formed by machining, an increase in the degree of freedom regarding the groove depth, a reduction in the price of the sleeve, etc. Thus, it is possible to provide a spindle motor of a stable quality and low price.

When the sleeve inner diameter is 0.6 mm or more, ball rolling can be utilized by using two balls for ball rolling currently on the market (with a minimum diameter of 0.3 mm), which is advantageous in terms of cost. When the sleeve inner diameter is 3 mm or less, it allows application to an ultrasmall product, such as a bearing device for DVD or HDD or 1.0 to 1.8 inches, and ball rolling with mandrel rotation cannot be conducted with other metal materials, thus making the superiority of this aluminum silicon alloy conspicuous. When an electro-chemical machining, which is a conventionally adopted system other than rolling, is performed on a sleeve with an inner diameter within the range of 0.6 to 3 mm, the product quality is rather unstable due to the unstableness of the gap control with respect to the jig, generation of unevenness in groove depth, etc., with the result that the cost is increased, and a mass production is rather difficult to perform.

To achieve the above objects, the disk drive device of the present invention adopts a spindle motor as the drive mechanism for rotating the disk.

In this disk drive device, the sleeve which is the bearing portion of the spindle motor used and hub or the sleeve and rotor are integrated into an integral member of an aluminum silicon alloy, so that an improvement is achieved in terms of impact resistance, and further, since the requisite verticality can be easily obtained, it is possible to make the A-RRO very small. Reduction in the size and the thickness of the motor is also achieved. Further, due to the adoption of an aluminum silicon alloy, it is possible to use the ball rolling system without mandrel rotation in the formation of grooves in the inner peripheral surface of the sleeve, so that it is possible to produce with a stable quality and at low price a disk drive device using an ultrasmall dynamic pressure bearing device whose sleeve inner diameter is as small as 0.6 to 3 mm.

Further, in the dynamic pressure bearing device used in this disk drive device, various measures are taken to maintain the requisite rigidity of the bearing, so that it is possible to substantially reduce the possibility of the sleeve and the shaft coming into contact with each other. Further, when the dynamic pressure bearing device and the spindle motor are of the shaft fixing type, it is possible to incorporate the integral member formed by integrating the thrust plate and the shaft even if a thrust plate whose diameter is larger than that of the shaft is integrated with the shaft.

Further, to achieve the above objects, according the method of manufacturing a dynamic pressure bearing device of the present invention, there is provided a method for manufacturing a dynamic pressure bearing device having a base, a shaft fixed to the base, and a sleeve rotatably provided around the shaft, wherein the axial thickness of the shaft and base is thicker than that in the completed state, and wherein, after mounting the shaft into the base, part of the shaft bottom side and part of the base bottom side are cut simultaneously such that their cut surfaces are fixed flat surfaces, thus attaining the thickness in the completed state.

By adopting this manufacturing method, it is possible to obtain sufficient verticality of the shaft with respect to the base even in the case of a shaft fixing type bearing device with a small axial thickness. That is, it is possible to reduce the A-PRO of the sleeve, and to easily meet the requirement for a reduction in thickness.

Further, according to another aspect of the invention, there is provided a method of manufacturing a dynamic pressure bearing device having a metal base, a metal shaft fixed to the base, and a sleeve rotatably arranged around the shaft, the method including causing, after incorporating the shaft into the base, an electric current to flow through the base to effect intermolecular bonding in a contact portion where the shaft and the base are in contact with each other.

By adopting this manufacturing method, it is possible to facilitate and strengthen the fixation of the base and the shaft. In particular, the shaft and the base are turned into an integral member by intermolecular bonding, so that, as compared with the conventional method using press-fitting alone, it is possible to achieve a superiority in strength and to meet the requirement for a reduction in thickness.

Further, according to another aspect of the invention, there is provided a method of manufacturing a dynamic bearing device having a shaft, a sleeve arranged so as to be capable of rotating relative to the shaft, and a base fixing one of the shaft and the sleeve, the method including forming the sleeve and at least part of a member integrally rotating with the sleeve, or the sleeve and at least part of a member constituting a fixing member together with the sleeve, of an integral member made of an aluminum silicon alloy containing aluminum and silicon, and setting a coefficient of linear expansion of the integral member to a range of $10 \times 10^{-6}$ to $17 \times 10^{-6}$ through adjustment of a silicon content, the integral member being formed by forging after mixing aluminum powder and silicon powder with each other and sintering the same.

By adopting this manufacturing method, it is possible to adopt forging, which could not be adopted for an aluminum silicon alloy formed by atomization due to its excessive hardness, thereby achieving an improvement in productivity and a reduction in cost.

Further, according to another aspect of the invention, there is provided a method of manufacturing a dynamic bearing device having a shaft, a sleeve arranged so as to be capable of rotating relative to the shaft, and a base fixing one of the shaft and the sleeve, the method including forming the sleeve of an aluminum alloy containing aluminum and silicon, and after adjusting its inner diameter to a range of 0.6 to 3 mm, providing a dynamic pressure groove for the radial bearing in an inner peripheral surface of the sleeve by a ball rolling system without mandrel rotation.

By adopting this manufacturing method, no burr or plucking is generated during formation of grooves by machining. Further, it is possible to manufacture ultrasmall dynamic pressure bearing devices with a stable quality and in a great quantity. In particular, due to the adoption of the aluminum silicon alloy, if this manufacturing method is adopted, it is possible to manufacture dynamic pressure bearing devices of a sufficiently high quality at low cost and in a great quantity.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 10 is a table showing changes in the gap with temperature changes in different combinations of the materials used in the shaft and the sleeve of the spindle motor of FIG. 1 and of a conventional spindle motor.

DETAILED DESCRIPTION OF THE INVENTION

In the following, dynamic pressure bearing devices and spindle motors according to embodiments of the present invention will be described with reference to the drawings. Note that, regarding a disk drive device with a spindle motor mounted thereon, only its spindle motor and the vicinity thereof will be described. A head portion which read information from a disk or write information to a disk, a circuit portion such as the control circuit for controlling the spindle motor and the head portion thereof, etc., and the other mechanism portions are the same as those of a conventional disk device, so a description thereof will be omitted.

Figure 1:
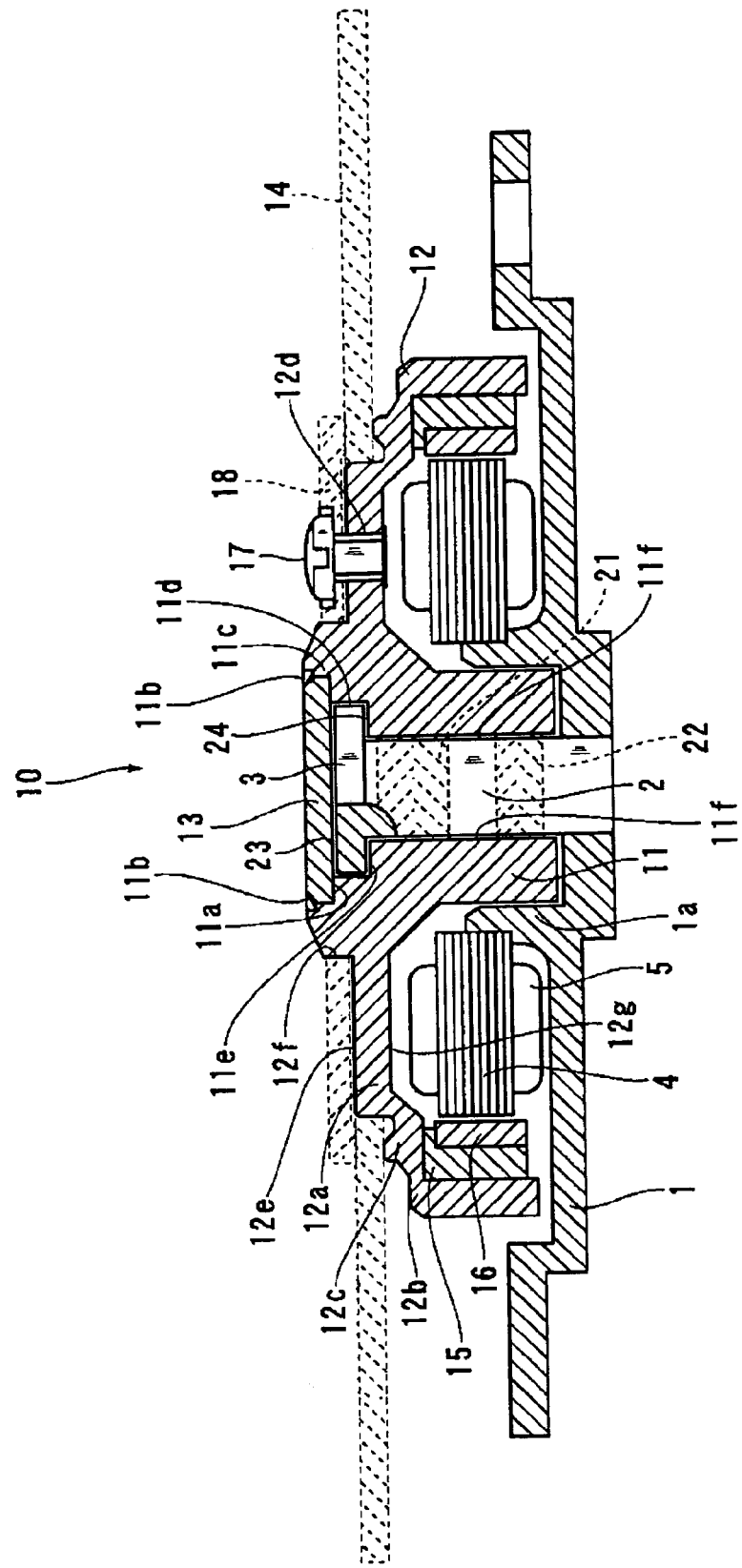
FIG. 1 is a sectional view showing the construction of a dynamic pressure bearing device and spindle motor according to a first embodiment of the present invention.

A spindle motor 10 according to a first embodiment of the present invention is a shaft fixing type spindle motor, and is mounted in an HDD. Note that, the dynamic pressure bearing device is incorporated in the spindle motor 10. As shown in FIG. 1, in the spindle motor 10, a shaft 2 is fixed to a base 1 formed of a metal such as aluminum, or a hard resin material such as a functional resin, by one or a plurality of various fixing methods including press-fitting, shrinkage fit, adhesion, soldering, and intermolecular bonding using electric current. At the forward end (the upper side in FIG. 1) of the shaft 2, a thrust plate 3 is provided integrally with the shaft 2, constituting a thrust plate portion. That is, the shaft 2 and the thrust plate 3 form an integral member consisting of a single component. In view of a second integral member described below, this integral member will be hereinafter referred to as the first integral member.

Note that, it is also possible to form the thrust plate 3 as a separate member, fixing it to the shaft 2 by one or a plurality of various fixing methods including press-fitting, shrinkage fit, adhesion, soldering, and intermolecular bonding utilizing electric current.

The first integral member is formed of a stainless steel (SUS-304), which is an iron type alloy containing 18% by weight of Cr and 8% by weight of Ni. In the first integral member, the outer periphery of this bar-shaped SUS-304 is cut, whereby a cylindrical portion corresponding to the shaft 2 and a circular portion (more specifically, flat cylindrical portion) corresponding to the thrust plate 3 are formed. While the axial thickness of the thrust plate 3 portion is set to 0.3 mm, it is desirable for the thickness to be in the range of 0.1 to 0.7 mm from the viewpoint of strength and decrease in current loss. It is still more desirable if the range is 0.15 to 0.35 mm.

The coefficient of linear expansion of the first integral member is $16.4 \times 10^{-6}$, and its Vickers hardness is approximately 196. It is also possible for the first integral member to be formed of some other material as long as it is an SUS-300 type material. That is, it is only necessary for the material to be an iron type alloy containing 10.5 to 32% by weight of Cr and 4 to 13% by weight of Ni. It should be noted, however, that it is desirable for its coefficient of linear expansion to be $17 \times 10^{-6} \pm 5\%$. The term "coefficient of linear expansion" refers to a coefficient of linear expansion regarding a change in the length of a solid body; it is to be expressed as a value of $(dl/d\theta)/lo$, where l is the length, lo is the length of the body at 0° C., and θ is the temperature. The coefficient of linear expansion of the shaft side portion (SUS-304) constituting the first integral member is in a substantially fixed range of 0° C. to 100° C. Here, the expression "fixed" means not only a case in which there is no change at all but also a case in which the degree of change is approximately one fifth or less of that in the second integral member described below.

At the center of the base 1, there is provided a cylindrical portion 1a, and, in the outer periphery of the cylindrical portion 1a, there are stacked together thin magnetic metal plates whose central hole portions are fitted onto the cylindrical portion 1a, thus forming a core 4. The fixation of the core 4 is effected by one or a combination of a plurality of methods, such as adhesion, press-fitting, and crimping. Formed on the core 4 are a plurality of radially extending salient poles at predetermined circumferential intervals, with a winding 5 being provided on each salient pole. An accommodating space S accommodating the core 4 and the coil windings 5 can be larger than that in the prior for the reason stated below. The base 1, the core 4, the coil windings 5, etc. constitute a stator of the spindle motor 10.

In the periphery of the first integral member, there is arranged the second integral member consisting of a cylindrical sleeve portion 11 serving as a bearing and a disc-like hub portion 12. The second integral member is formed of an aluminum silicon alloy containing 67 to 68% by weight of Al, 30% by weight of Si, and 2 to 3% by weight of Cu, etc., and is subjected to heat treatment.

While it is possible to adopt various methods as the heat treatment method, this embodiment adopts T6 treatment and T1 treatment. In T6 treatment, solution heat treatment is effected, that is, the temperature is raised up to a point almost immediately before melting and then rapid cooling (quenching) is effected; thereafter, artificial age hardening is effected, that is, a certain temperature is maintained for a specific period of time to effect cooling slowly (tempering). In T1 treatment, cooling is effected after high temperature processing, and then age hardening is effected at room temperature. For a dynamic pressure bearing device, T6 treatment is more preferable since it provides a harder material, etc.

The density of this aluminum silicon alloy is 2.6 g/cm$^3$, which is slightly less than that of conventionally known aluminum alloys, such as A6061, which is 2.7 g/cm$^3$. In the case of T6 treatment, the coefficient of linear expansion is $14 \times 10^{-6}$ when measured in the range of 0° C. to 100° C., $14.7 \times 10^{-6}$ when measured in the range of 40° C. to 100° C., $16.0 \times 10^{-6}$ when measured in the range of 100° C. to 200° C., $17.6 \times 10^{-6}$ when measured in the range of 200° C. to 300° C., and $19.0 \times 10^{-6}$ when measured in the range of 300° C. to 400° C. In the case of T1 treatment, it is $13.2 \times 10^{-6}$ when measured in the range of 0° C. to 100° C., $13.6 \times 10^{-6}$ when measured in the range of 40° C. to 100° C., $15.7 \times 10^{-6}$ when measured in the range of 100° C. to 200° C., $16.6 \times 10^{-6}$ when measured in the range of 200° C. to 300° C., and $18.7 \times 10^{-6}$ when measured in the range of 300° C. to 400° C. Of these measurements, the measurements in the range of 40° C. to 400° C. were performed in nitrogen gas flow by differential dilation measurement in the range of room temperature to 400° C. at a temperature rising rate of 10° C. per minute.

In this way, in the aluminum silicon alloy forming the second integral member, the higher the temperature, the larger the value of its coefficient of linear expansion (In the range of 40° C. to 400° C., it increases, on the average, by approximately $0.15 \times 10^{-6}$ per 10° C. in the case of T6 treatment and by approximately 0.15 to $0.18 \times 10^{-6}$ per 10° C. in the case of T1 treatment). Taking into account measurement errors, slight modifications in metal content proportion, etc., this coefficient of linear expansion, with regard to the first integral member side, is not set to $14 \times 10^{-6}$ or $13.2 \times 10^{-6}$ when measured in the range of 0° C. to 100° C. but in the range of ±5% of these values.

Further, it is also possible to adopt an aluminum silicon alloy whose coefficient of linear expansion ranges such that the smaller value thereof is $10 \times 10^{-6}$, which is equivalent to that of an SUS-400 type material, and that the larger value thereof is $17 \times 10^{-6}$, which is equivalent to that of an SUS-300 type material. Further, it is also possible for the larger value to be $16.5 \times 10^{-6}$ or less, which is slightly smaller than that of an SUS 300 type material. In particular, in the case in which dynamic pressure generation is effected with air, the gap forming the dynamic pressure groove may be always the same with respect to temperature changes, so that, when the shaft 2 is formed of an SUS-400 type material, the coefficient of linear expansion of the aluminum silicon alloy may be a value that is the same as or slightly smaller than that of an SUS-400 type material, and when the shaft 2 is formed of an SUS-300 type material, the coefficient of linear expansion of the aluminum silicon alloy (the second integral member) may be a value that is the same as or slightly smaller than that of an SUS-300 type material. Further, when T6 treatment is performed around 100° C., the value is preferably ±5% of $15.3 \times 10^{-6}$; the range, however, may be widened. In any case, it is desirable for the coefficient of linear expansion of the aluminum silicon alloy to be equivalent to or smaller than that of the shaft 2.

Further, even if the material contains 60 to 90% by weight of Al, 9 to 39% by weight of Si, and 1 to 5% by weight of Cu, etc., it is possible to obtain properties sufficiently superior to those of the conventional materials. Further, when the material contains 20% by weight of Si, 75 to 79% by weight of Al, and 1 to 5% by weight of Cu, etc., the coefficient of linear expansion is approximately $17 \times 10^{-6}$ when measured in the range of 0° C. to 100° C. By using an aluminum silicon alloy of this composition for the second integral member, forming the shaft of an SUS-300 type material, and using air for dynamic pressure generation, it is possible to obtain a sufficient performance for a dynamic pressure bearing device. Judging from experiment results, it is desirable for the material to contain 65 to 84% by weight of Al, 15 to 32% by weight of Si, and 1 to 5% by weight of Cu, etc. When the shaft 2 is formed of an SUS-300 type material, and oil is used for dynamic pressure generation, an aluminum silicon alloy containing 65 to 69% by weight of Al, 28 to 32% by weight of Si, and 1 to 5% by weight of Cu, etc. is preferable in terms of compatibility. As described above, it is also possible to set the coefficient of linear expansion of the aluminum silicon alloy to $10 \times 10^{-6}$ to $17 \times 10^{-6}$ when measured in the range of 0° C. to 100° C. or ±5% of $14 \times 10^{-6}$ through adjustment of the content of silicon (Si) and the content of Cu, etc.

The second integral member is formed of a newly developed aluminum silicon alloy having a coefficient of linear expansion as mentioned above. Its hardness is equivalent to or lower than that of the first integral member, and is approximately 114 to 165 [kg/mm] in Vickers hardness. When its Vickers hardness is 80 or more, there is no fear of the second integral member being dented when the first and second integral members collide with each other at the rotation start and rotation stop of the second integral member. The hardness varies depending on the heat treatment method and conditions, and it is possible to appropriately obtain a desired value for the device from this range (Vickers hardness of 114 to 165 [kg/mm]). In the case of an extruded member having undergone no heat treatment, the Vickers hardness is 114 [kg/mm], and the second integral member obtained by heat treatment has a Vickers hardness of 165 [kg/mm]. By changing the heat treatment method, it is possible to make the hardness somewhat higher still. The second integral member is obtained by hot forging of an extruded member into a predetermined configuration, and then performing T6 or T1 heat treatment thereon.

Figure 2:
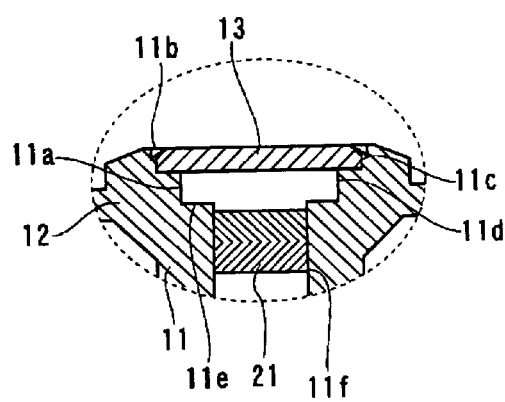
FIG. 2 is an enlarged view of a counter plate of the spindle motor of FIG. 1 and a portion around the same, with the integral member of FIG. 1 omitted.

A disc-like metal counter plate 13 is fixed to the sleeve 11 portion of the second integral member so as to close one end (the upper side in FIG. 1) of the central hole thereof. As shown in FIG. 2, in performing this fixation, the counter plate 13 is placed on an upper step flat portion 11a on the upper end side of the sleeve 11 of the second integral member, and thereafter the sleeve 11 side is squeezed, thereby holding the counter plate 13. The squeezed portion is indicated by symbol 11b. After the squeezing operation, adhesive may be applied to the squeezed portion 11b.

Apart from the above-mentioned upper step flat portion 11a and the squeezed portion 11b, the sleeve 11 portion of the second integral member has a sleeve inner peripheral portion 11c engaged with the outer periphery of the counter plate 13 and having a large diameter, a sleeve inner peripheral portion 11d opposed to the outer periphery of the thrust plate 3 portion and having a small diameter, a lower step flat portion 11e opposed to the lower surface as seen in FIG. 1 of the outwardly protruding portion of the thrust plate 3 portion, and a shaft facing inner surface portion 11*f* opposed to the shaft 2 portion and having the minimum diameter.

The hub 12 portion of the second integral member formed of an aluminum silicon alloy has: a disk placing step portion 12*a* on which a disk 14 consisting of a hard disk is to be placed; a large diameter cylindrical portion 12*b* concentrically fixing and holding a yoke 15 in the form of a cylinder formed of magnetic metal and a cylindrical magnet 16 fixed to the yoke 15 by adhesion, press-fitting, squeezing, etc.; a disk placing portion 12*c* on which the disk 14 is to be placed; a screw hole 12*d* for passing a screw 17 for fixing the disk 14 in the state in which the disk 14 is placed on the disk placing portion 12*c*; a clamper placing portion 12*e* on which there is placed a damper 18 for holding the disk 14 between itself and the disk placing portion 12*c*; a damper fitting step portion 12*f* to be fitted into a central hole of the damper 18; and a coil facing recess 12*g* recessed so as to secure a sufficient space for the coil winding 5. Usually, the second integral member, the counter plate 13, the yoke 15, the magnet 16, etc. form the rotor portion of the spindle motor 10; in this specification, however, the rotor is what is obtained by excluding the sleeve 11 portion from the rotor as considered in the ordinary sense.

The aluminum silicon alloy constituting the material of the second integral member, which has the material component as mentioned above, is manufactured as shown in FIG. 3. First, liquid quenching powder of aluminum alloy is produced by an atomization method (step S51). As the atomization method, gas atomization, ultrasonic gas atomization or the like is adopted.

This liquid quenching powder is formed by causing an alloy liquid consisting of aluminum and silicon to flow out of a tandish (a container with a hole at the bottom), and at the same time, by causing a jet of a spray medium (gas or liquid) to impinge upon the liquid flow, the liquid being scattered to become minute droplets and solidified by losing heat. This powder is an aluminum powder of approximately 100 μm containing a multitude of silicon granules having a grain size, for example, of approximately 2 μm.

Thereafter, an additive consisting of ceramics and a special alloy powder is added (step S52), and is mixed with the liquid quenching powder such that the final material contains 67 to 68% by weight of Al, 30% by weight of Si, and 2 to 3% by weight of Cu (copper), etc. Then, a green compact in the form of a billet is obtained by hot press (step S53). Thereafter, heating is performed in a vacuum or a non-oxidizing atmosphere to perform degassing to remove water absorbing oxidant and non-oxidant adhering to the surfaces of the powder, and the like (step S54). Next, hot extrusion is performed (step S55), whereby an extruded material is obtained. This extruded material is processed to form the prototype of the second integral member. Thereafter, heat treatment is performed as appropriate.

The coefficient of linear expansion of the aluminum silicon alloy thus obtained varies depending on the content of silicon (Si). In this embodiment, the aluminum silicon alloy contains 30% by weight of silicon and has a coefficient of linear expansion of approximately $14 \times 10^{-6}$ when measured in the range of 0° C. to 100° C. When the content of silicon is further increased, the coefficient of linear expansion decreases in proportion thereto. When the silicon content becomes approximately 36%, the coefficient of linear expansion becomes approximately $13 \times 10^{-6}$. When the silicon content becomes approximately 44 to 48%, the coefficient of linear expansion becomes approximately $10 \times 10^{-6}$ (which is approximately the same as that of an SUS-400 type material). When the content of silicon becomes approximately 20%, the coefficient of linear expansion becomes approximately $17 \times 10^{-6}$ (which is approximately the same as that of an SUS-300 type material). Instead of varying the content of silicon alone, it is also possible to mix silicon with nickel, and to gradually increase the total amount of silicon and nickel from 30% by weight, thereby achieving a reduction in coefficient of linear expansion.

The disk 14 is mounted when the spindle motor 10 is mounted to the disk drive device. In performing this mounting, the disk 14 is placed on the disk placing portion 12*c*, and then the damper 18 is placed on the damper placing portion 12*e*, fastening the screw 17 while passing the screw 17 through the screw hole 12*d*. The disk 14 of this embodiment is a disk for a 2.5 inch hard disk.

In the portion which corresponds to the slight gap between the first integral member formed by the shaft 2 and the thrust plate 3 and the second integral member formed by the sleeve 11 and the hub 12 and in which the dynamic pressure groove to be described below is formed, there is introduced a dynamic pressure oil, and the oil is retained so as not to leak out of the sleeve 11 portion.

The gap between the outer peripheral surface of the shaft 2 portion and the shaft facing inner surface portion 11*f* of the sleeve 11 portion is 1 to 4 μm. Generally speaking, when the diameter of the shaft 2 portion is 4 mm, the gap is 4 μm, and when the diameter of the shaft 2 portion is 3 mm, the gap is 3 μm; thus, the size of the gap is 1/100 of the diameter of the shaft 2 portion. In this embodiment, the diameter of the shaft 2 portion is 2.5 mm, and the gap between the shaft 2 portion and the shaft facing inner surface portion 11*f* is 2.5 μm. Further, the gap between the thrust plate 3 portion and the counter plate 13, and the gap between the thrust plate 3 portion and the sleeve 11 portion are also 2.5 μm.

Two radial bearing dynamic pressure grooves are provided in the shaft facing inner surface portion 11*f*. That is, at one end of the shaft facing inner surface portion 11*f* (the upper side as seen in FIG. 1), there is provided a first radial dynamic pressure groove 21 regulating the radial movement of the second integral member, and at the other end thereof (the lower side as seen in FIG. 1), there is provided a second radial dynamic pressure groove 22 having a similar function. In this embodiment, the first and second radial dynamic pressure grooves 21 and 22 are formed by fixing type ball rolling without mandrel rotation.

In forming the radial dynamic pressure grooves, the following three methods are generally adopted. The first method is an electrolytic processing. The second method is the rotating type ball rolling with mandrel rotation. The third method is the fixing type ball rolling without mandrel rotation. The electrolytic processing is advantageous in that it allows groove formation also in a hard material such as SUS; on the other hand, it has a problem, for example, in that the quality thereof is rather unstable due to that the gap control with respect to the jig being rather difficult and variation in groove depth or the like, that it is not suitable for a small diameter bearing, that it is not suited for mass production, and that it involves high cost.

The rotating type ball rolling has been developed as a method applicable to a sleeve formed of a relatively hard material such as SUS; however, it involves play, which leads to a rather unstable product quality; further, it is inadequate also in terms of productivity. Thus, as a substitute for the rotating type ball rolling, the above-described electrolytic processing has been developed. The rotating type ball rolling system is advantageous in that no burring or plucking is generated during groove formation due to smooth rolling of the balls. This system, however, has, in addition to the above-mentioned unstable product quality, a problem in that it has a construction in which a mandrel arranged in a central portion surrounded by the balls rotates, so that it requires a space for accommodating a strong mandrel, and when the diameter is 3 mm or less, this type of ball rolling cannot be used.

The fixing type ball rolling is adopted when the sleeve is formed of a relatively soft material, such as brass. While a mandrel may be provided, this mandrel does not rotate, so that there is no need for the diameter of the mandrel to be large. Thus, the system is theoretically applicable even to a case in which the sleeve diameter is as small as 0.1 mm. However, since the diameter of the balls on the market is 0.3 mm, it is desirable to apply the system to a sleeve with a diameter of 0.6 mm, which is the minimum value when two balls are used, without providing any mandrel. The fixing type ball rolling is generally regarded as unsuitable for a hard material such as SUS. However, the aluminum silicon alloy of this embodiment is superior in extendibility while having a coefficient of linear expansion substantially equal to that of an SUS-300 type or SUS-400 type material, so that it allows adoption of this fixing type ball rolling system.

In the portion of the counter plate 13 covering the thrust plate 3 portion, which is opposed to the thrust plate 3 and which is opposed to a portion outwardly protruding from the shaft 2 portion of the thrust plate 3, there is provided a first thrust dynamic pressure groove 23 regulating the movement of the second integral member in the thrust direction. Further, in the lower step flat portion 11e of the sleeve 11 portion, that is, the flat portion opposed to the thrust plate 3 portion protruding outwardly from the shaft 12 portion, there is provided a second thrust dynamic pressure groove 24 having a similar function.

As shown in FIGS. 1 and 2, the first and second radial dynamic pressure grooves 21 and 22 consist of a plurality of V-shaped grooves arranged in parallel in the circumferential direction to make one round in the shaft facing inner surface portion 11f. Both the first and second thrust dynamic pressure grooves 23 and 24 consist of a large number of V-shaped grooves arranged in circles. The dynamic pressure grooves 21, 22, 23, and 24 may also be of some other configuration. For example, the thrust dynamic pressure grooves may consist of circular grooves of different diameters arranged concentrically, or spiral grooves, and the radial dynamic pressure grooves may simply consist of oblique linear grooves instead of being V-shaped grooves.

As described above, the radial dynamic pressure grooves 21 and 22 are formed by the fixing type ball rolling system; depending on the size of their diameter, however, it is also possible to adopt other processing methods, such as electrolytic processing or the rotating type ball rolling. The thrust dynamic pressure grooves 23 and 24 are formed by stamping, etching, cutting, rolling, such as ball rolling, electrical discharge machining, etc. The dynamic pressure oil is supplied to the first radial dynamic pressure groove 21, the second radial dynamic pressure groove 22, the first thrust dynamic pressure groove 23, and the second dynamic pressure groove 24, filling the grooves 21, 22, 23, and 24.

The assembly procedures for the dynamic pressure bearing device and the spindle motor 10, constructed as described above, will now be described.

First, the shaft (the first integral member) formed integrally with the thrust plate 3 is inserted into the second integral member having the hub 12. Next, the counter plate 13 is arranged in the large diameter sleeve inner peripheral portion 11c such that its outer periphery is opposed thereto and that it comes into contact with the upper step flat portion 11a, and then the counter plate 13 is fixed to the sleeve 11 portion by squeezing. Then, adhesive is applied to the squeezed portion 11b as needed. Thereafter, the gap between the first integral member and the second integral member (approximately 2.5 μm in this example) is filled with dynamic pressure oil by utilizing a vacuum device. The yoke 15 and the magnet 16 are previously fixed to the second integral member by press-fitting, adhesion, squeezing, etc. so as to be concentric thereto.

On the other hand, the core 4 is fixed to the base 1 by adhesion, press-fitting, squeezing, etc, and the coil windings 5 are wound around the salient poles, thereby forming the stator. It is also possible to fix the core 4 to the base 1 after providing the coil windings 5 in the core 4. The above-mentioned shaft 2 is fixed to the central hole of the base 1 constituting the stator by one or a combination of a plurality of methods including press-fitting, shrinkage fit, adhesion, welding, and intermolecular bonding utilizing electric current. Here, the intermolecular bonding utilizing electric current is a method in which the shaft 2 is press-fitted into the central hole of the base 1 and then electric current is caused to flow through the base 1 to effect molecular bonding in the contact portion of the shaft 2 and the base 1. Thus, when adopting this method, it is necessary for the base 1 to be a conductor.

In this assembly state, the length of the shaft 2 and the axial thickness of the base 1 portion into which the shaft 2 is press-fitted are larger than those in the completed state. Thus, after the assembly, part of the bottom portions of the base 1 and the shaft 2 are cut to attain the size in the completed state. In this way, the spindle motor 10 is completed. The reason for adopting this assembly method is to obtain highly accurate verticality. To obtain highly accurate verticality, a press-fitting margin of a size appropriately the same as the diameter of the shaft 2 is required. The diameter of the shaft 2 of the spindle motor 1 for a 2.5 inch hard disk is approximately 2.5 mm, so that the thickness of the portion of the base 1 into which the shaft 2 is press-fitted is temporarily set to 2.5 mm, and, after attaining a sufficient degree of verticality, cutting is effected by approximately 1.5 mm to make the thickness in the final state of the bottom portion of the base 1 mm, thus achieving a reduction in thickness. In the case in which intermolecular bonding is utilized, the above-described cutting process may be omitted.

By adopting such an assembly method, the requisite verticality of the shaft 2 with respect to the base 1 is maintained, and, at the same time, a reduction in thickness is achieved. Further, since the bottom side portion of the base 1 is cut, there is no need to perform beveling on the outer end of the central hole of the base 1. This assembly method (the method in which cutting is effected after press-fitting the shaft 2) proves preferable when adopted for a spindle motor for ultrasmall and ultra-thin hard disk of 2.5 inch, 1.8 inch, etc.

When mounting the spindle motor 10 in a disk drive device, the disk 14 is placed on the disk placing portion 12c, and the damper 18 is placed on the damper placing portion 12e so as to hold the disk 14 between itself and the disk placing portion 12c. Thereafter, the damper 18 is fastened by the screw 17 to fix the disk 14. The spindle motor 10 in this state is incorporated into the disk drive device, and the other mechanisms, the other circuits, etc. are provided, thereby completing the disk drive device.

Next, the basic operation of the dynamic pressure bearing device will be described, and, with that, the characteristics of the spindle motor 10 using the dynamic pressure bearing device and the disk drive device in which the spindle motor 10 is mounted will be compared with the characteristics of a conventional device.

First, the basic operation of the dynamic pressure bearing device will be described; first, what constitutes the prerequisite for evaluation, i.e., the relationship between variation in oil viscosity, the evaluation bearing device, variation in gap, and bearing characteristics will be described with reference to FIGS. 4 through 9.

Figure 4:
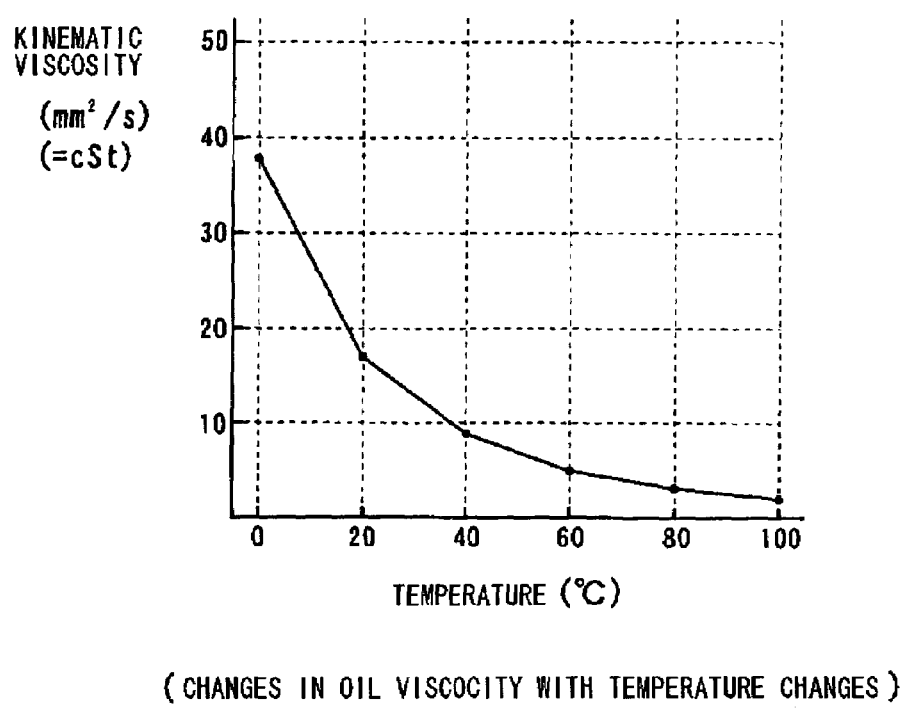
FIG. 4 is a graph showing the property of an oil (change in the viscosity of the oil with temperature changes) used in the dynamic pressure grooves of the spindle motor of FIG. 1.

FIG. 4 shows changes in the kinematic viscosity of an oil (an ordinary oil for use in a dynamic pressure bearing) with respect to temperature. The kinematic viscosity is a value obtained by dividing viscosity (absolute viscosity) by density. For example, when the viscosity is 1 mPa·s (millimeter·pascal·second), and the density is 1 g/cm², the kinematic viscosity is 1 mm²/s (square-millimeter·pascal·second). The value is the same as in the conventional centistoke (cSt) unit. As in the case of viscosity, the larger the value of kinematic viscosity, the higher the "viscosity", which indicates a hard material.

As shown in FIG. 4, the kinematic viscosity of an oil decreases abruptly when the temperature rises. A reduction in viscosity leads to a reduction in bearing rigidity, that is, dynamic pressure. Thus, when the temperature rises, in order to maintain the bearing rigidity, it is necessary to diminish the gap between the shaft and the bearing. However, when the gap is excessively small, the bearing rigidity becomes excessively high, resulting in an increase in shaft loss torque, and, at worst, the shaft and the bearing coming into contact with each other to be locked (which means, no rotation is possible).

Figure 5:
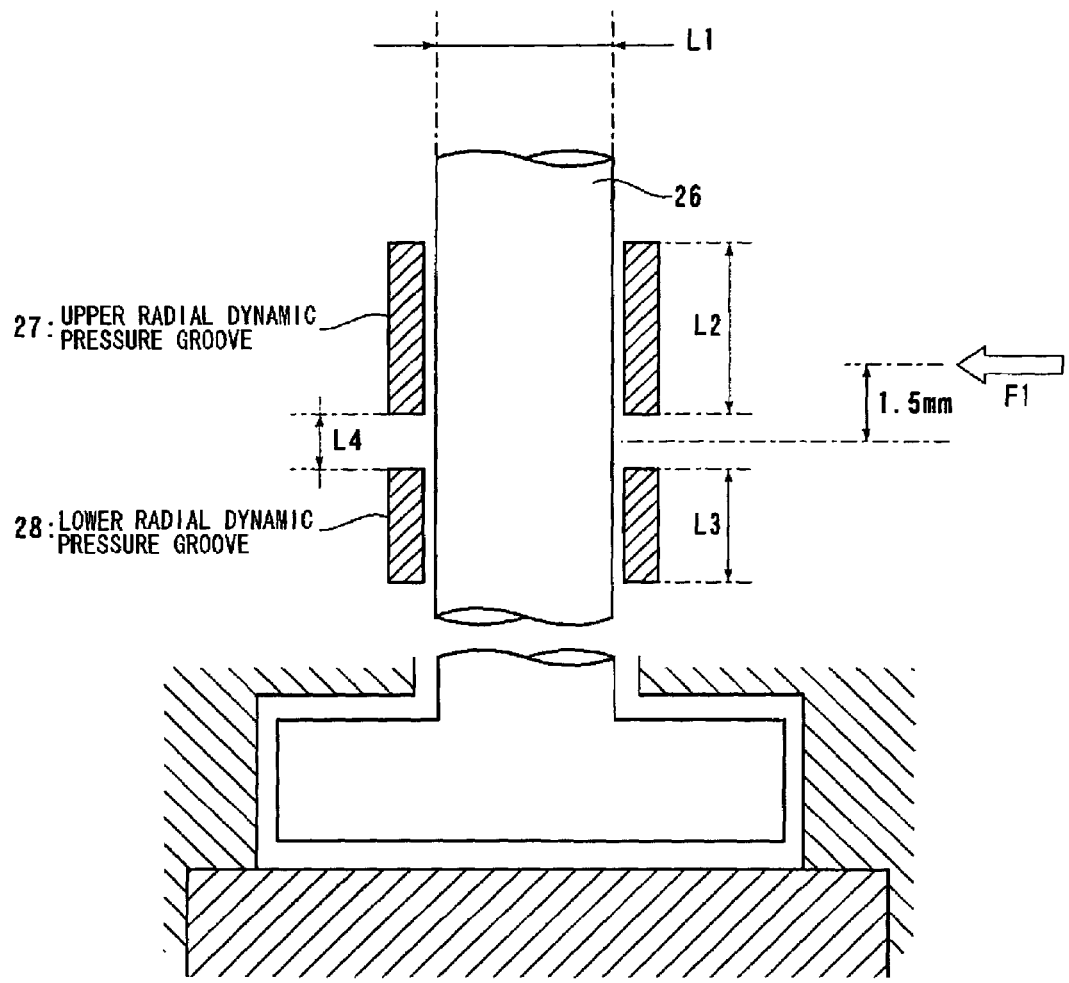
FIG. 5 is a diagram showing an evaluation bearing device for evaluating various performances of the spindle motor of FIG. 1 and a conventional spindle motor.

FIG. 5 shows an evaluation bearing device. In this device, the diameter L1 of a shaft 26 is 3 mm, the width L2 of an upper radial dynamic pressure groove (upper BRG) 27 is 3 mm, and the width L3 of a lower radial dynamic pressure groove (lower BRG) is 2 mm, with a lateral external force F1 of 0.01 kg being applied to the position and in the direction as shown in FIG. 5. That is, the distance L4 between the upper BRG 27 and the lower BRG 28 is 1 mm, and the lateral external force F1 is applied to a position deviated from the central position toward the upper BRG 27 by 1.5 mm. Further, provided below is a thrust bearing portion whose diameter is larger than that of the shaft 26. The RPM of the shaft 26 is 7200 RPM. FIGS. 6 to 9 show the results of analysis of the bearing characteristics (eccentricity and shaft loss torque) as obtained when the gap between the shaft 2 (corresponding to the shaft 26) and the shaft facing inner surface portion 11f of the sleeve 11 (corresponding to the upper BRG 27 and the lower BRG28) is varied in 0.5 μm intervals, using the above-mentioned oil and evaluation bearing device.

In the case of an HDD, the most important characteristic is NRRO, which is greatly influenced by the bearing rigidity. The smaller (lower) the bearing rigidity, the greater the change in the gap and the greater the eccentricity; as known experimentally and empirically, the permissible value of eccentricity is approximately 0.01. Eccentricity e is an index showing how flat an ellipsoid is; assuming that the longer radius as measured from the ellipsoid center to the longitudinal outer periphery is a and that the shorter radius as measured from the center to the latitudinal outer periphery is b, it is defined by Formula 1 shown below. When the eccentricity e is 0, a perfect circle results. Assuming that F is the sum total of the forces acting on the rotor (the sum total of the external forces) and the x is the changing amount of the rotor, bearing rigidity is a value indicated by k in the expression: k=F/x; here, it is given in the unit [kg·f/μm].

$$e = \sqrt{a^2 + b^2}/a \qquad \text{(Formula 1)}$$

Figure 6:
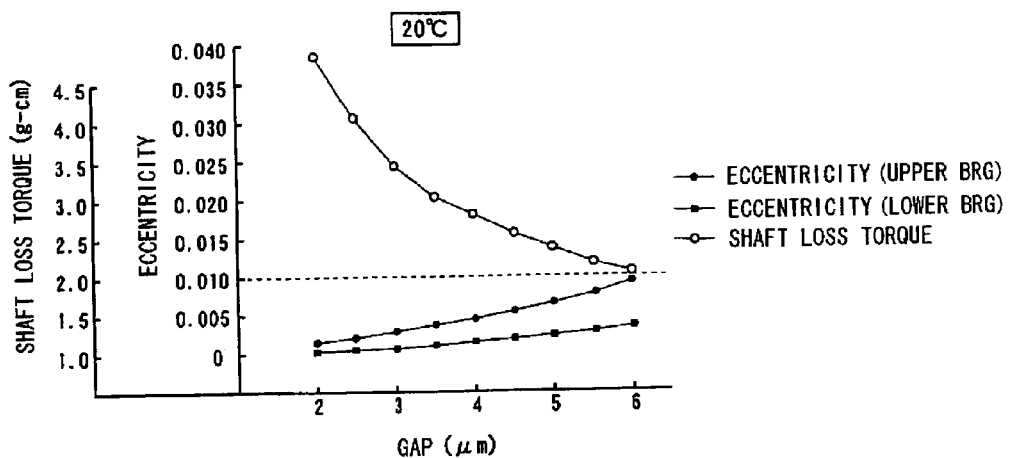
FIG. 6 is a graph showing bearing characteristics (shaft loss torque and eccentricity) as obtained with the oil of the property as shown in FIG. 4 and the evaluation bearing device of FIG. 5 by varying the shaft outer diameter and the sleeve inner diameter in 0.5 μm intervals at a temperature of 20° C.
Figure 7:
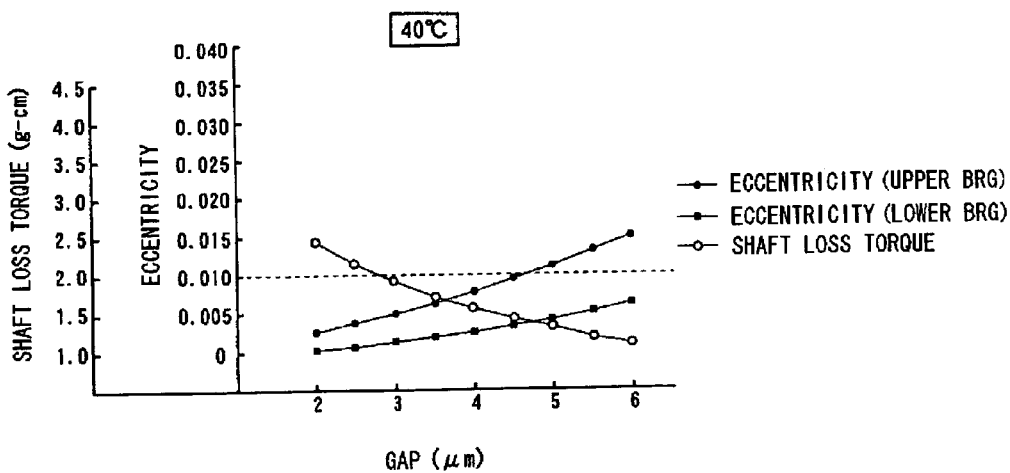
FIG. 7 is a graph showing bearing characteristics (shaft loss torque and eccentricity) as obtained with the oil of the property as shown in FIG. 4 and the evaluation bearing device of FIG. 5 by varying the shaft outer diameter and the sleeve inner diameter in 0.5 μm intervals at a temperature of 40° C.
Figure 8:
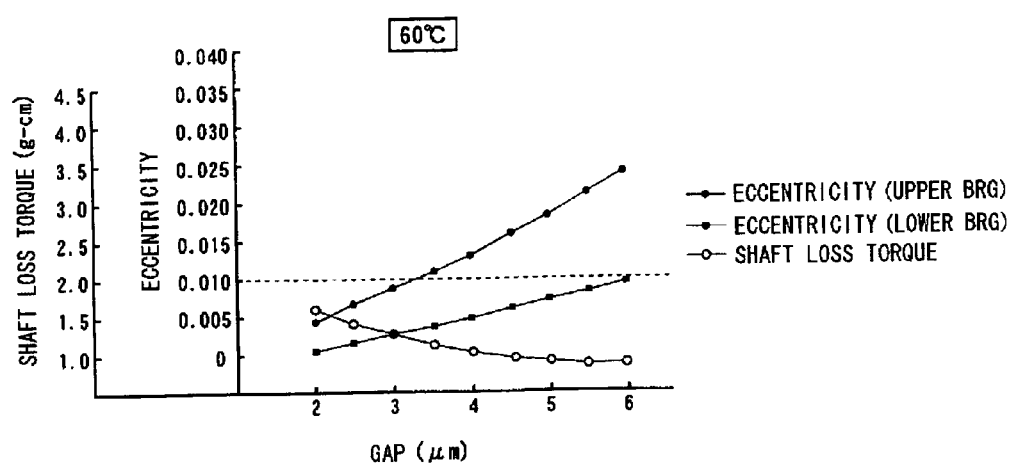
FIG. 8 is a graph showing bearing characteristics (shaft loss torque and eccentricity) as obtained with the oil of the property as shown in FIG. 4 and the evaluation bearing device of FIG. 5 by varying the shaft outer diameter and the sleeve inner diameter in 0.5 µm intervals at a temperature of 60° C.
Figure 9:
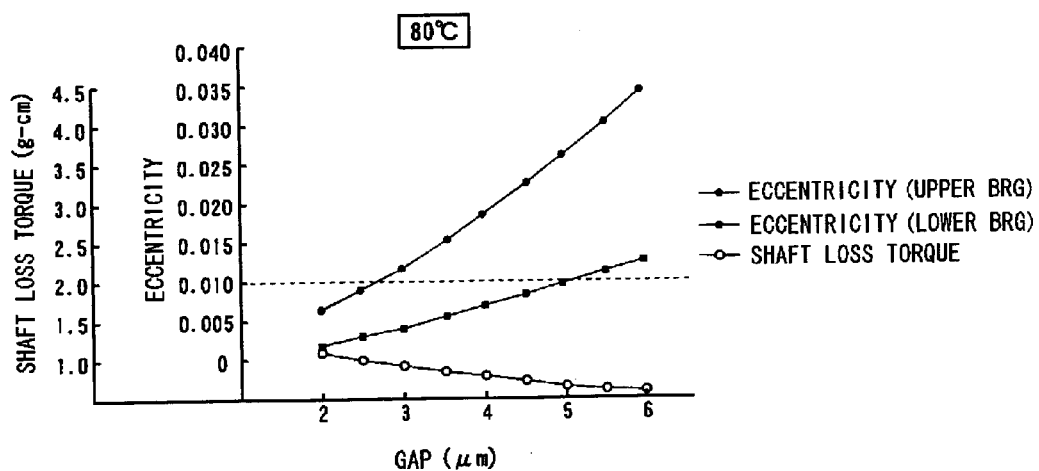
FIG. 9 is a graph showing bearing characteristics (shaft loss torque and eccentricity) as obtained with the oil of the property as shown in FIG. 4 and the evaluation bearing device of FIG. 5 by varying the shaft outer diameter and the sleeve inner diameter in 0.5 µm intervals at a temperature of 80° C.

In the case of a low temperature of 20° C. as shown in FIG. 6, there is relatively abundant leeway in terms of eccentricity, whereas, at high temperature, the viscosity is lowered and the bearing rigidity is lowered, so that the device cannot be used without making the gap 2 to 3 μm. That is, as shown in the graphs of FIGS. 8 and 9 showing the cases of temperatures of 60° C. and 80° C., at high temperature, the eccentricity e in the upper radial dynamic pressure groove 27 portion (which corresponds, in FIG. 1, to the upper, first radial dynamic pressure groove 21) exceeds 0.01 when the gap is approximately 3 μm. On the other hand, when the gap is excessively small, the shaft loss torque increases, and, at worst, the shaft 2 and the sleeve 11 may come into contact with each other to make rotation impossible. Here, the shaft loss is a toque lost due to the viscosity of the oil, etc. when the shaft rotates; the smaller its value, the better. Here, it is indicated in the unit [g·cm].

Next, a variation in rigidity due to temperature changes, which is one of the basic operations of the dynamic pressure bearing devices will be described.

The gap is also changed by thermal expansion of the shaft and the sleeve. FIG. 10 shows changes in the gap with respect to temperature changes depending on the combination of the materials of the shaft and the sleeve. The dynamic pressure bearing device generates pressure through rotation; the smaller the gap, and, the higher the oil viscosity, the higher the pressure that can be generated. The oil viscosity is high at low temperature, and low at high temperature. Thus, when selecting the materials of the shaft and the sleeve, by making the coefficient of linear expansion of the shaft larger than that of the sleeve, the gap is reduced at high temperature, thereby making it possible to compensate for a reduction in pressure due to a reduction in viscosity.

When the materials currently used for spindle motors and the aluminum silicon alloy used in the present invention are formed into shafts and sleeves, their combination and characteristics can be summarized as follows. First, when the shaft and the sleeve are formed of the same material, the gap undergoes no change with temperature. The fact that the gap length undergoes no change means that the gap remaining the same while both the outer diameter of the shaft and the inner diameter of the sleeve increase, which indicates that volume of the gap portion increases. At high temperature, the oil viscosity is low. Thus, an increase in the volume of the gap portion and a reduction in oil viscosity occur simultaneously, resulting in a deterioration in bearing rigidity. Further, when the shaft and the sleeve are formed of the same material, the shaft is damaged when the shaft and the sleeve collide with each other, resulting in a deterioration in bearing characteristic. Forming the shaft and the sleeve of the same material thus involves a lot of problems, which means it is not desirable to adopt.

A combination in which the shaft is formed of an SUS-400 type material and in which the sleeve is formed of brass (BsBn) or a bronze type material, is relatively satisfactory as far as workability is concerned. However, in terms of thermal expansion, it involves an increase in the gap at high temperature, which leads to a reduction in oil viscosity and a deterioration in bearing rigidity. In particular, a spindle motor for use in a small HDD of 1.8 inch, 2.5 inch, etc. has no leeway in terms of bearing rigidity, so that the gap between the dynamic pressure groove portions must be designed to be very minute. However, it is difficult to meet the severe tolerance required; further, depending on the temperature (low temperature), interference between the shaft and the sleeve occurs, so that the bearing ceases to function as such. Further, the material of the sleeve is inadequate in terms of abrasion resistance, so that its surface requires plating with nickel/chromium, etc. Thus, this combination is not without its problems, either.

A combination in which the shaft is formed of an SUS-300 type material and in which the sleeve is formed of an SUS-400 type material is preferable as far as only thermal expansion is concerned. That is, the gap decreases with temperature rise, so that the reduction in rigidity due to the reduction in oil viscosity is advantageously compensated for. However, as discussed in detail with reference to the prior-art technique, forming the sleeve of an SUS-400 type material involves various problems due to its high hardness. That is, at high temperature, the gap is reduced, with the result that the shaft is brought into contact with the sleeve or locked. Further, it is difficult to perform high precision machining to attain the requisite inner diameter dimension, circularity, face matching property, cylindricity, etc., and dynamic pressure groove machining. When the variation in the inner diameter dimension increases, an appropriate gap between the shaft and the sleeve cannot be obtained, and selective combination through measurement is required. In the dynamic pressure groove machining also, the uniformity in groove depth and symmetry deteriorate, adversely affecting the bearing characteristic. In this way, the combination in which the shaft is formed of an SUS-300 type material and in which the sleeve is formed of an SUS-400 material involves problems in terms of performance, productivity, price, etc.

When the shaft is formed of an SUS-300 type material, and the sleeve is formed of an aluminum silicon alloy as used in the second integral member of the present invention, the gap is gradually diminished as the temperature increases as shown in the table of FIG. 10. More specifically, the gap is widened by 0.2 μm at 0° C., undergoes no change at 20° C., is diminished by 0.2 μm at 40° C., by 0.4 μm at 60° C., by 0.6 μm at 80° C., and by 0.8 μm at 100° C. Each of these values is an optimum value in compensating for a reduction in rigidity due to a reduction in oil viscosity.

The values shown in FIG. 10 are obtained with a shaft diameter of 3 mm; when the shaft diameter is of some other value, e.g., 2.5 mm or 2 mm, the absolute value of the increasing amount due to expansion of the shaft is reduced, so that the amount by which the gap varies is also reduced. However, generally speaking, when the shaft diameter is small, with regard to the bearing rigidity, the gap must also be small, so that the proportion of the gap varying amount with respect to the original gap size is not varied so greatly also when the shaft diameter is small. Strictly speaking, however, the proportion undergoes a change, so that, even when the shaft is formed of an SUS-300 type material, and the sleeve is formed of an aluminum silicon alloy according to the present invention, it is necessary for the difference between their coefficients of linear expansion to differ according to the shaft diameter. While in the above-described embodiment the difference between their coefficients of linear expansion is approximately $1.5 \times 10^{-6}$ to $4.5 \times 10^{-6}$, when the shaft diameter is approximately 2 mm, the gap is approximately 2 μm, and the difference between them must be $7 \times 10^{-6}$ or less; conversely, when the shaft diameter is approximately 4 mm, the gap is approximately 4 μm, and a difference between them of $1 \times 10^{-6}$ or more suffices.

Next, as the last of the basic operations of the dynamic pressure bearing device, the relationship between consumption current and rigidity will be described.

The rigidity of a bearing and electric current mutually contradictory. That is to increase the rigidity of a bearing, it is necessary to diminish the gap and increase the oil viscosity. On the other hand, to reduce the electric current, that is, to reduce the loss torque, it is necessary to increase the gap and reduce the oil viscosity. To reduce the shaft loss torque while maintaining the same bearing rigidity, the shaft diameter is reduced and the gap is also diminished. However, this involves a reduction in the inner diameter of the sleeve and a stricter tolerance, so that it is very difficult to perform machining with higher precision on a hard material as conventionally used, such as brass or an SUS-300 type material. When using a conventional material, it is necessary to perform measurement all of the shaft diameters and sleeve inner diameters for selective combination; this method, however, involves a substantial increase in cost. Further, since the sleeve inner diameter becomes small, the circularity thereof is rather poor in precision, resulting in a reduction in yield.

Figure 11:
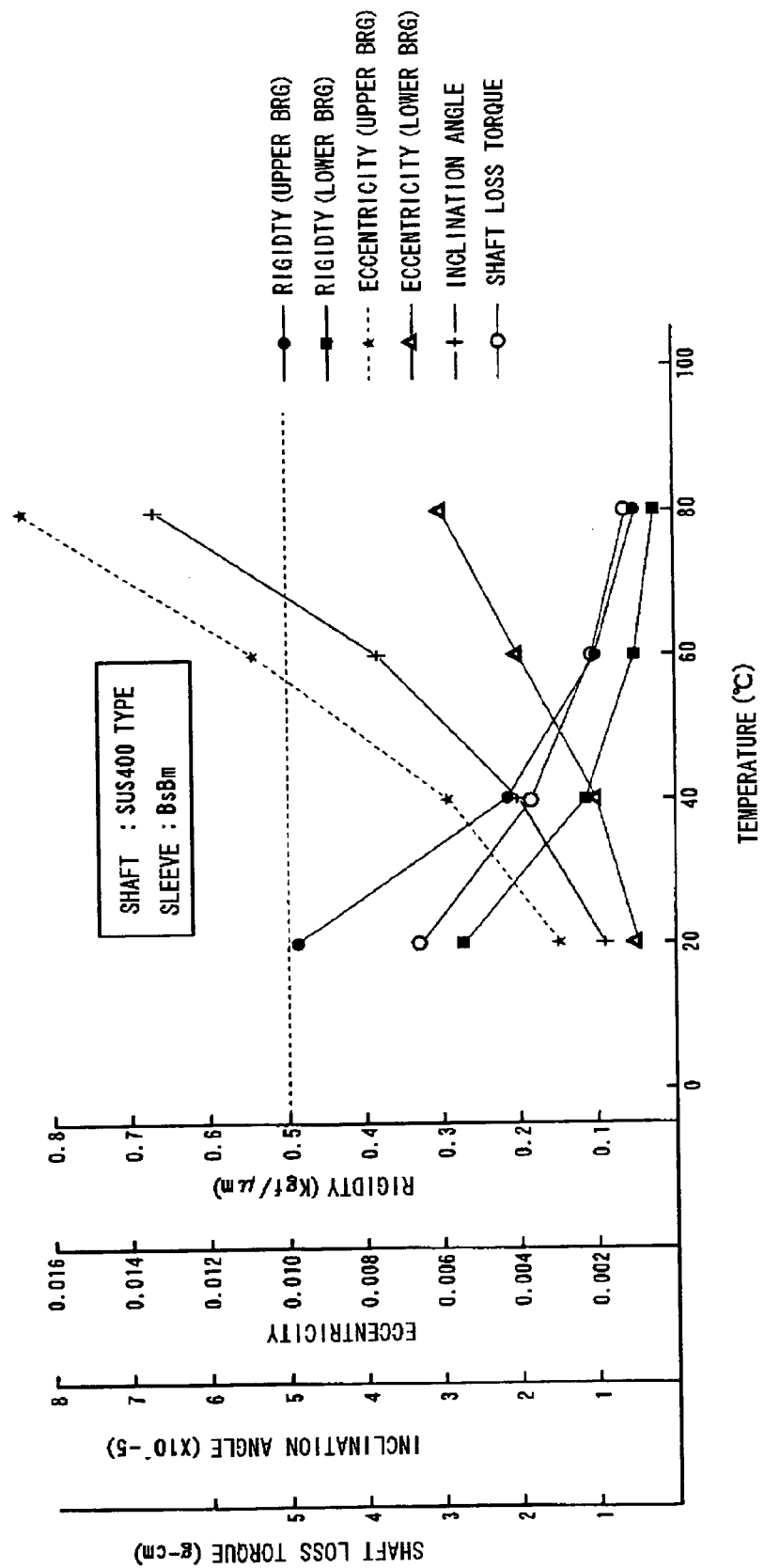
FIG. 11 is a graph showing bearing characteristics with respect to temperature in different combinations of materials adopted in a conventional spindle motor (shaft loss torque, inclination angle, eccentricity, and bearing rigidity).

The above consideration will be discussed with reference to FIGS. 11 and 12. FIG. 11 shows a case in which the shaft is formed of an SUS-400 type material and in which the sleeve is formed of brass, and FIG. 12 shows the construction of the present invention, that is, a case in which the shaft 2 is formed of SUS-304 and in which the sleeve 11 is formed of the aluminum silicon alloy of the present invention.

As shown in FIG. 11, when there are adopted an SUS-400 type material for the shaft and brass for the sleeve, when the temperature exceeds around 58° C., the eccentricity e of the upper radial dynamic pressure groove 27 exceeds 0.01, which is the permissible limit value. Further, the inclination angle increases abruptly with temperature rise. Here, the term inclination angle refers to the inclination of the shaft with respect to the base; it is 0 degree when the shaft is at 90 degrees (perpendicular) with respect to the base.

Figure 12:
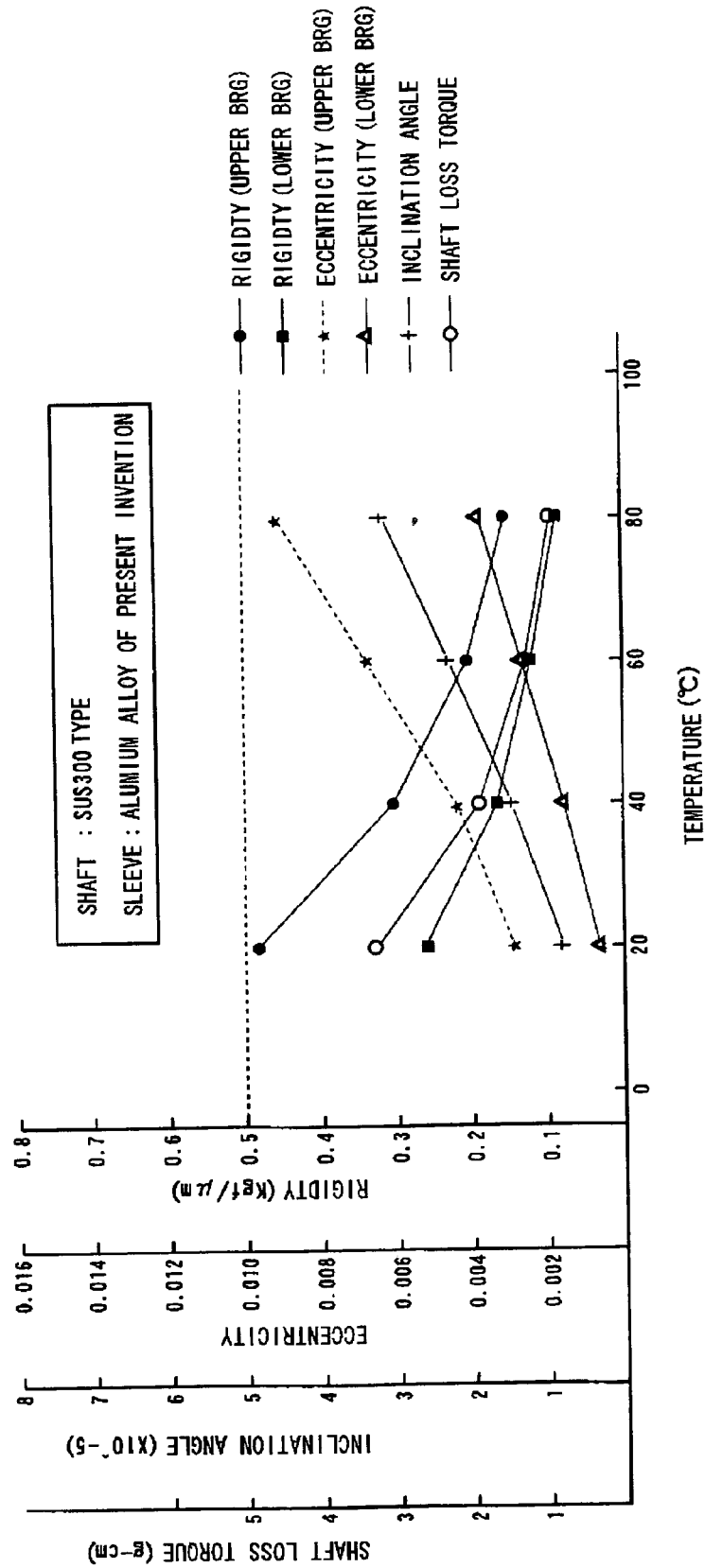
FIG. 12 is a graph showing bearing characteristics with respect to temperature in different combinations of materials adopted in the spindle motor shown in FIG. 1 (shaft loss torque, inclination angle, eccentricity, and bearing rigidity).

In contrast, in the combination of the present invention (in which the shaft 26 corresponding to the shaft 2 is formed of an SUS-300 type material and in which the upper BRG 27 and the lower BRG 28 corresponding to the sleeve 11 are formed of the aluminum silicon alloy of the present invention), the eccentricity e is within the permissible limit value of 0.01 in the temperature range of 20° C. to 80° C., as shown in FIG. 12.

In this way, with the aluminum silicon alloy used in this embodiment, the coefficient of linear expansion is a value smaller than the value of the shaft 2 without deteriorating the basic properties of aluminum, such as workability, corrosion resistance, light weight, low price, and high strength. That is, by utilizing the nature of aluminum in which as silicon (Si) and other additives are added thereto, the coefficient of linear expansion decreases, there is obtained an aluminum silicon alloy whose coefficient of linear expansion is $14 \times 10^{-6} \pm 5\%$ within the measurement range of 0° C. to 100° C.; it is also possible to obtain an aluminum silicon alloy whose coefficient of linear expansion ranges from $10 \times 10^{-6}$ to $16.5 \times 10^{-6}$ (or $17 \times 10^{-6}$). As an example of the coefficient of linear expansion of this aluminum silicon alloy, there is adopted a value which is substantially the medium between the respective coefficients of linear expansion of SUS-300 type and SUS-400 type materials, that is, $14 \times 10^{-6}$. In an aluminum silicon alloy whose coefficient of linear expansion is $14 \times 10^{-6}$, the coefficient of linear expansion ranges from approximately $13.5 \times 10^{-6}$ to $15.3 \times 10^{-6}$ within the measurement range of 0° C. to 100° C., and the higher the temperature, the larger the value. The measurement range of 0° C.

to 100° C. is the heat resistance condition required for a hard disk motor, and constitutes the temperature environment of use thereof.

The other properties of an example of the aluminum silicon alloy used in this embodiment (which contains 30% by weight of Si, 2 to 3% by weight of Cu, etc., the rest being Al, and whose coefficient of linear expansion is $14 \times 10^{-6}$) are as follows. The tensile strength is 46.6 kgf/mm$^2$, the proof stress is 40.0 kgf/mm$^2$, the Young's modulus is 9700 kgf/mm$^2$, the hardness is 150 Hv (in Vickers hardness), and the density is 2.6 g/cm$^3$.

In the above-described embodiment, the shaft 2 and the thrust plate 3 are formed as an integral member of an SUS-300 type material, and the sleeve 11 and the hub 12 are formed as an integral member of the aluminum silicon alloy as mentioned above, so that the RRO (in particular, A-RRO) and NRRO are both very small. This is due to the fact that there is no fitting engagement between the sleeve and the hub and that there is no fitting engagement between the shaft and the thrust plate. This helps to perfectly maintain the perpendicularity of the sleeve 11 portion and the hub 12 portion. That is, when the sleeve and the hub are formed as an integral member and working is performed simultaneously on the disk placing portion 12c of the hub 12 portion and other portions, it is possible to attain highly accurate perpendicularity and horizontality of the various portions. This also applies to the integral member formed of the shaft 2 and the thrust plate 3.

Further, since both integral members adopt no fitting structure, an improvement is achieved in terms of impact resistance, and no uneven stress is exerted, making it possible to maintain a stable accuracy in terms of both time (passage of time) and temperature. Further, in this embodiment, the sleeve 11 portion and the hub 12 portion are formed as an integral member, there is no need to take into account the fixation of the hub 12 portion to the sleeve 11 portion, whereby it is possible for the accommodating space for the core 4 and the coil windings 5 to be sufficiently large, and it is possible to achieve a reduction in current loss. Further, since the radial bearing dynamic pressure grooves 21 and 22 are provided on the sleeve 11 side where the hardness is lower, it is possible to form the dynamic pressure grooves in the interior of the sleeve 11 easily and without involving any cracks as in the case of the conventional brass sleeve.

Further, in the dynamic pressure bearing device of the above-described embodiment and the spindle motor 10 using this dynamic pressure bearing device, the perpendicularity of the rotary parts and the shaft 2 can be maintained with high accuracy, so that it is possible to obtain a stable dynamic pressure force and to elongate the service life. Further, since both integral members adopt no fitting structure, an improvement is achieved in terms of heat/impact resistance.

Further, since the thrust bearing dynamic pressure grooves 23 and 24 are provided in the counter plate 13 opposed to the thrust plate 3 and in the sleeve 11 opposed to the thrust plate 3, an increase is achieved in terms of the degree of freedom regarding the installation positions of the dynamic pressure grooves, a more appropriate dynamic pressure effect can be easily obtained, and the centering of the dynamic pressure grooves can be effected more easily as compared with the case in which the dynamic pressure grooves are provided in the thrust plate 3, the area of which is apt to be rather small.

Further, in this embodiment, the integral members thereof are formed of an aluminum silicon alloy whose coefficient of linear expansion is $14 \times 10^{-6} \pm 5\%$ when measured in the range of 0° C. to 100° C., so that the dynamic pressure grooves can be formed more easily in the sleeve 11 portion, and it is possible to adopt an SUS-300 type material for the shaft 2 portion. Further, in this embodiment, the thickness of the base portion of the hub 12 (the hub side of the connecting portion of the sleeve and the hub in the conventional motor) is 1.3 times as large as the thickness of the disk 14 placed, so that the integral rotation with the disk 14 is smoothened, and the accommodating space S for the core 4 and the coil windings 5 can be increased. By enlarging the accommodating space S, it is possible to suppress the current loss.

Further, the axial thickness of the thrust plate 3 portion of the shaft 2 is 0.3 mm, which is ⅓ to ⅕ as compared with that in the prior art, so that it is possible to reduce the axial length of the motor to achieve a reduction in thickness and to achieve a substantial reduction in current loss while sufficiently meeting the requirements in terms of the function of a thrust bearing.

Further, in this disk drive device, the A-RRO is diminished, the variation in bearing rigidity is reduced, and the current loss can be suppressed, so that it is possible to read and write information from and to the disk 14 without involving any errors, and to achieve a long-time operation when using a battery. Apart from the A-RRO, the RRO and NRRO can also be reduced markedly.

Further, as stated above, in this embodiment, an increase in the degree of freedom is achieved in terms of the installation positions of the thrust bearing dynamic pressure grooves 23 and 24 and of design, making it easy to obtain a more appropriate dynamic pressure effect. Thus, as a disk drive device, it is possible to provide a device of high quality free from errors in the writing and reading of information. Further, in this disk drive device, the various RRO and NRRO (at least A-RRO thereof) of the inner spindle motor are thus reduced, and the axial length is diminished, so that the reading and writing of information is stabilized, and it is possible to achieve a reduction thickness of the device as a result of the reduction in the thickness of the motor.

Figure 13:
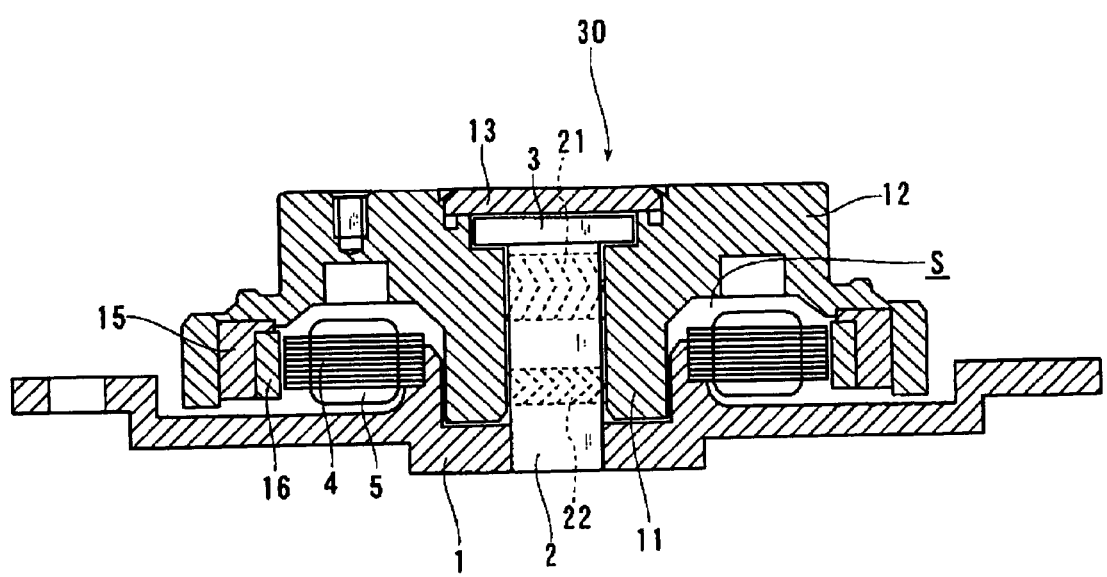
FIG. 13 is a sectional view showing the construction of a first modification of the spindle motor of FIG. 1.

While the above-described embodiment of the present invention are preferred ones, the present invention allows various modifications without departing from the scope of the gist of the invention. For example, regarding the spindle motor using the above-described dynamic pressure bearing device, it is possible, as in the case of the spindle motor 30 of the first modification shown in FIG. 13, to extend the axial length of the outer periphery of the hub 12 portion, increasing the number of disks 14 that can be placed. Otherwise, it is basically of the same construction as the spindle motor 10 shown in FIG. 1. Thus, the same components are indicated by the same reference numerals and a detailed description thereof is omitted. This also applies to the following modifications.

Figure 14:
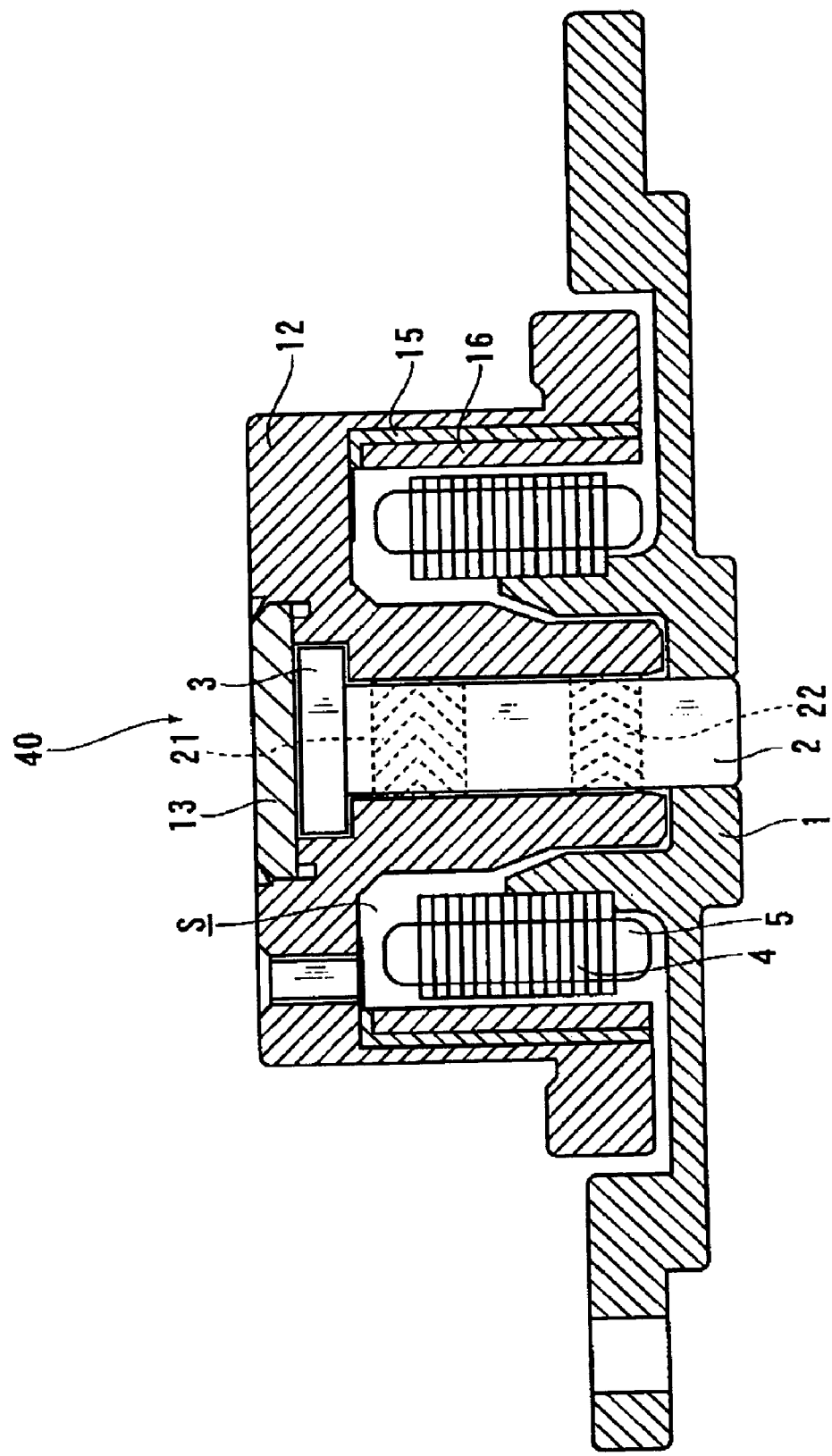
FIG. 14 is a sectional view showing the construction of a second modification of the spindle motor of FIG. 1.

Further, in the spindle motor 40 of the second modification 2 shown in FIG. 14, the axial length of the contour of the hub 12 portion is increased, and the core 4, the coil windings 5, the yoke 15, and the magnet 16 are arranged in the accommodating space S. In this spindle motor 40 also, it is possible to increase the number of disks 14 that can be placed. Otherwise, it is basically of the same construction as the spindle motors 10 and 30 shown in FIGS. 1 and 13.

Figure 15:
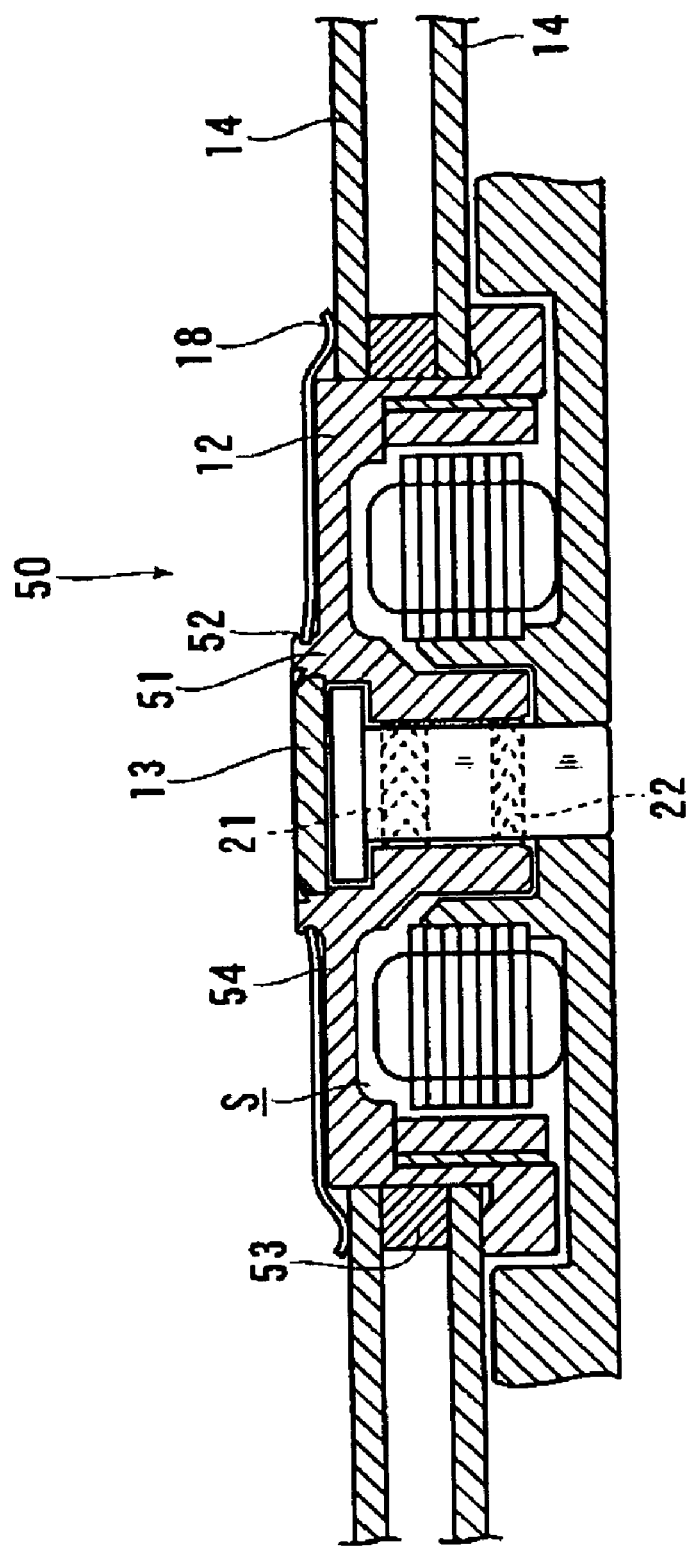
FIG. 15 is a sectional view showing the construction of a third modification of the spindle motor of FIG. 1.

Further, as in the case of the spindle motor 50 of the third modification shown in FIG. 15, it is also possible to adopt a configuration suitable for mounting in an HDD of 2.5 inches or less. In this small-sized spindle motor 50, the upper portion of the hub 12 portion near the counter plate 13 is somewhat extended upwards to obtain a boss-shaped portion 51 as shown in FIG. 15, and a groove 52 is provided in the outer periphery of the boss-shaped portion 51, fitting the inner peripheral portion of the damper 18 into it, whereby two disks 14 are fixed. Between the two disks 14, there is provided a cylindrical distance maintaining member 53 for forming and maintaining the distance between the disks 14.

In the spindle motor 50, the thickness of the damper 18 is reduced, and there are no screws for fixing the disks 14, so that it is possible to reduce the axial height of the hub 12 portion. Further, when it is of the same height as that in the prior art, it is possible to upwardly move the first radial dynamic pressure groove 21, so that the moment rigidity can be increased. Further, the thickness of the base portion 54 of the hub 12 (the hub-side portion of the connecting portion of the sleeve and the hub in the conventional motor) is substantially the same as the thickness of the disk 14, so that the integral rotation with the disk 14 is smoothened, and the accommodating space S for the core 4 and the coil windings 5 can be large in spite of the reduction in thickness. As an result of the increase in the accommodating space S, it is possible to suppress the current loss.

The spindle motors 10, 30, 40, and 50 of the above-described embodiment and the modifications thereof are of the so-called shaft fixing type; by thus adopting the shaft-fixing type structure, it is advantageously possible to maintain with high accuracy the perpendicularity of the relative rotation portions (the sleeve 11 and the shaft 2 portion; and the hub 12 and the thrust plate 3 portion). That is, of the two relative rotation portions of the spindle motor, it is desirable to form them as integral members in order to attain perpendicularity. Regarding this requirement, in the case of the shaft fixing type structure, the relative rotation portions can be separated into the integral member consisting of the thrust plate 3 and the shaft 2 and the integral member of aluminum silicon alloy consisting of the hub 12 and the sleeve 11, and the mounting thereof is possible. In contrast, in the case of the shaft rotating type structure, when the shaft and the thrust plate are formed as an integral member, the rotor portion inclusive of the hub portion (including the shaft, the thrust plate, and the hub) cannot be mounted. In this way, to achieve an improvement in terms of accuracy in perpendicularity, it is desirable to adopt the shaft fixing type structure.

Figure 16:
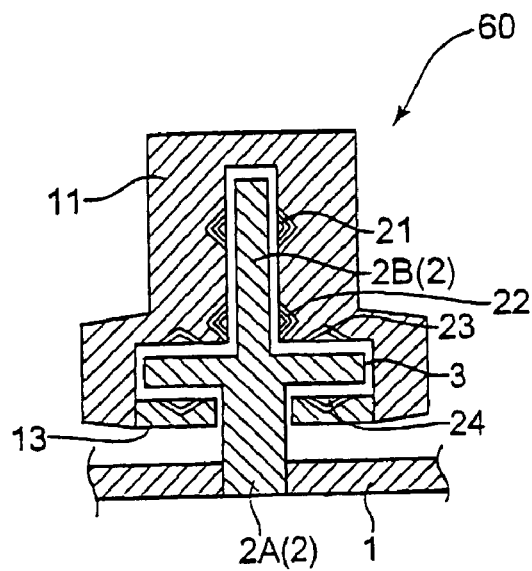
FIG. 16 is a main-portion sectional view showing the construction of a dynamic pressure bearing device according to a second embodiment of the present invention.

The shaft fixing type structure may be applied to the dynamic pressure bearing device 60 of the second embodiment shown in FIG. 16. In the dynamic pressure bearing device 60, the disc-like thrust plate 3 portion is arranged on the base side of the shaft 2 portion, and the ring-like counter plate 13 is provided so as to be opposed to the base 1. In this example, the shaft 2 has a base portion 2A constituting a large diameter base portion and a forward end portion 2B constituting a small diameter forward end portion opposed to the first radial dynamic pressure groove 21 and the second radial dynamic pressure groove 22, with the thrust plate 3 portion being provided at the boundary between the base portion 2A and the forward end portion 2B.

In the following drawings including FIG. 16, the dynamic pressure grooves 21, 22, 23, and 24 extend deep inwards from the inner peripheral surface, this is for the sake of clear illustration of the dynamic pressure grooves 21, 22, 23, and 24; actually, a groove with a slight depth of several µm is formed in the surfaces, such as the inner peripheral surface. When the fixing type ball rolling system is adopted, it is possible to form a groove of a uniform width and depth even if the groove depth ranges from 2 to 5 µm.

While the dynamic pressure bearing device 60 has a structure in which the hub and the rotor are mounted to the outer periphery of the sleeve 11 formed of an aluminum silicon alloy according to the above-described embodiment, it is also possible to use the sleeve 11 portion as the hub. Further, instead of mounting the hub and the rotor, it is also possible to simply use it as a bearing.

When the shaft 2 and the thrust plate 3 are not formed as an integral member, there are no problems regarding mounting, and the structure is well applicable to the shaft rotating type; further, due to the formation of the hub 12 and the sleeve 11 as an integral member of an aluminum silicon alloy, it is possible to achieve a reduction in A-PRO, etc.

Further, in the spindle motors 10, 30, 40, and 50 and the dynamic pressure bearing device 60 of the above-described embodiments and modifications thereof, the perpendicularity of the rotating parts and the shaft 2 can be maintained with high accuracy, so that it is possible to obtain a stable dynamic pressure force and to elongate the service life. Further, since the two integral members are not of a fitting structure, it is possible to achieve an improvement in impact resistance and heat/impact resistance. Even if this nature is partially sacrificed, it is possible to obtain a spindle motor having advantages over the conventional ones.

For example, while in the above embodiments and modifications the shaft 2 portion and the thrust plate 3 portion are formed as an integral member, and the sleeve 11 portion and the hub 12 portion are formed as an integral member, forming the spindle motor 10, 30, 40, 50 equipped with a dynamic pressure bearing device having two integral members, it is also possible to form a dynamic pressure bearing device or a spindle motor having only one of the two integral members. In this case also, an advantage can be achieved in terms of A-PRO, etc. over the conventional dynamic pressure bearing device or spindle motor. Further, also when the sleeve 11 and the hub 12 are not formed as an integral member but as two components, and the sleeve 11 is alone formed of an aluminum silicon alloy, it is possible to achieve an improvement in various bearing characteristics.

Further, while the above-described embodiments and modifications are applied to a so-called shaft fixing type dynamic pressure bearing device and spindle motor, it is also possible to use the aluminum silicon alloy constituting the material of the second integral member of the present invention for the sleeve portion of a shaft rotating type dynamic pressure bearing device or spindle motor or for an integral member formed by integrating the sleeve portion and the base portion, using an SUS-300 type material for the shaft. In this case, it is still more desirable if the shaft and the hub are formed as an integral member.

Figure 17:
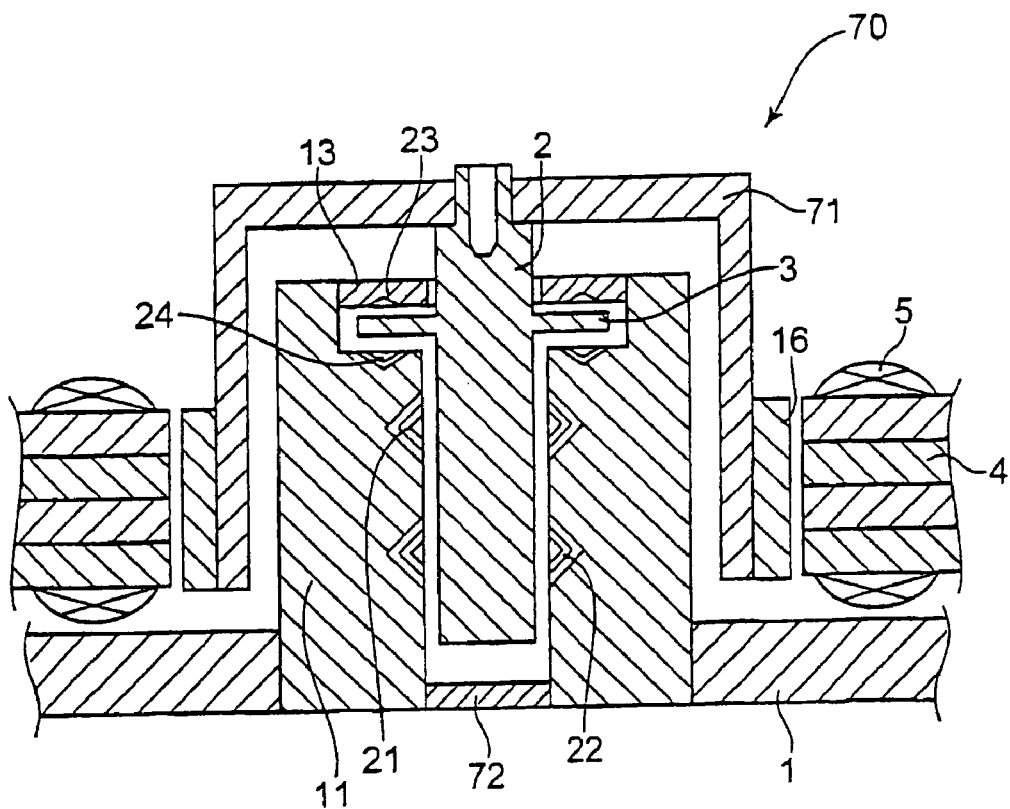
FIG. 17 is a main-portion sectional view showing the construction of a spindle motor according to a third embodiment of the present invention.

FIG. 17 shows, as the third embodiment, a spindle motor 70 using a shaft rotating type dynamic pressure bearing device. In this spindle motor 70, the shaft 2 is fitted for fixation into a rotor 71, and the shaft 2 and the rotor 71 rotate integrally. The thrust plate 3 portion consisting of SUS-304 is integrally formed on the rotating shaft 2. The ring-like magnet 16 is fixed to the outer periphery of the rotor 71, and arranged so as to be opposed to the core 4 provided with the core windings 5.

Like the sleeve 11 of the above-described embodiment, the sleeve 11 of this embodiment is formed of an aluminum silicon alloy. And, the sleeve 11 is fixed to the base 1, and the first and second radial dynamic pressure bearings 21 and 22 are formed in the inner peripheral surface thereof, with the second thrust dynamic pressure groove 24 being formed at a position opposed to the thrust plate 3 portion. The ring-like counter plate 13 is fixed by adhesive or the like to the portion of the sleeve 11 opposed to the thrust plate 3 portion. At the position of the counter plate 13 opposed to the thrust plate 3 portion, there is formed the first thrust dynamic pressure groove 23. Further, on the base 1 side of the sleeve 11, there is fitted for fixation a seal member 72 for closing the central hole.

The above-described method, in which, after press-fitting the shaft 2, the base 1 and the shaft 2 or only the shaft 2 is partially cut, can also be adopted in the second and third embodiments. In the case of the third embodiment, this cutting method can be adopted when mounting the sleeve 11 into the base 1.

Figure 18:
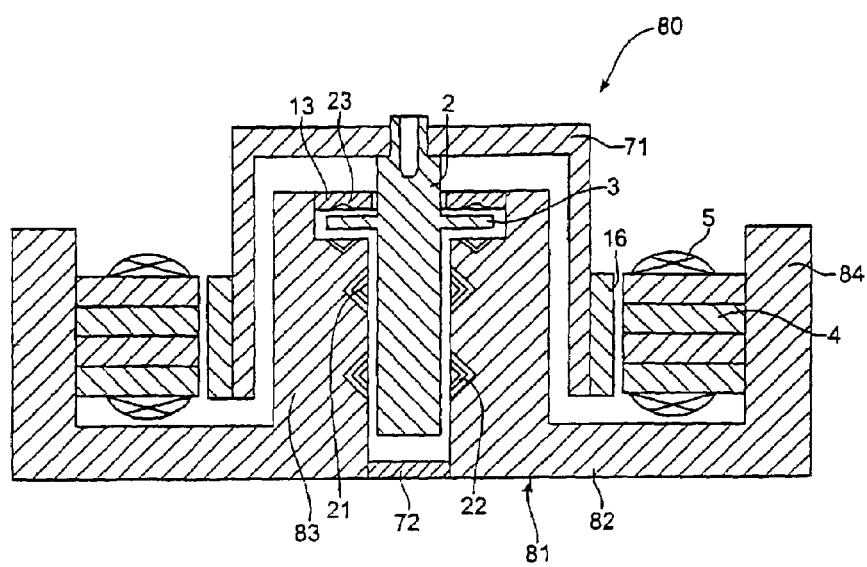
FIG. 18 is a diagram showing a modification of the spindle motor of the third embodiment of the present invention, of which portion (A) is a main-portion sectional view showing the construction thereof, and portion (B) is a perspective view of a base/sleeve member formed by integrating a base and a sleeve with each other.
Figure 18:
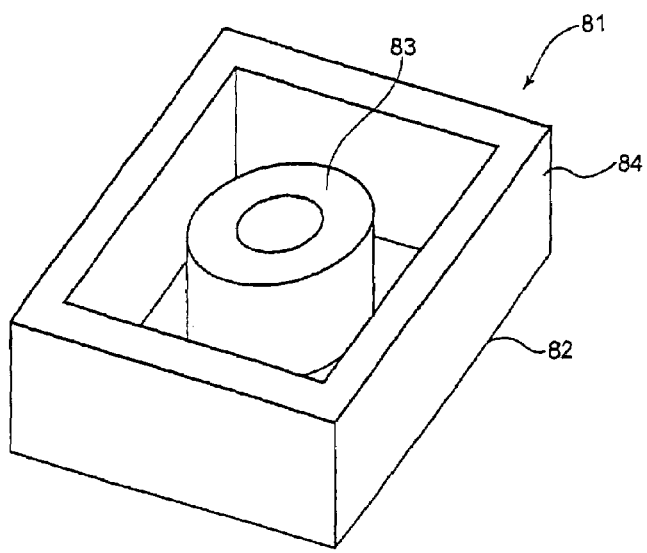
Figure 19:
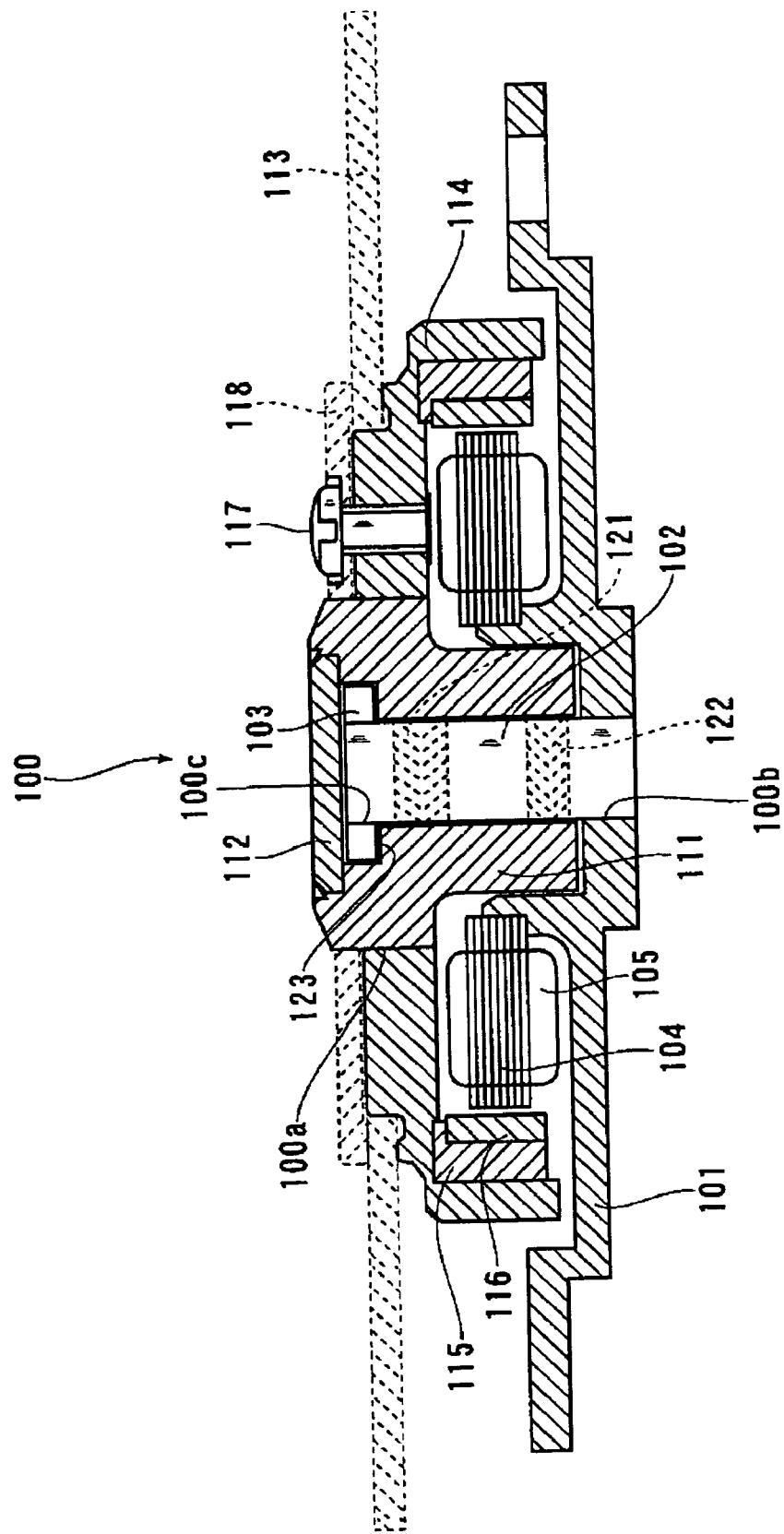
FIG. 19 is a sectional view showing the construction of a conventional shaft fixing type spindle motor.
Figure 20:
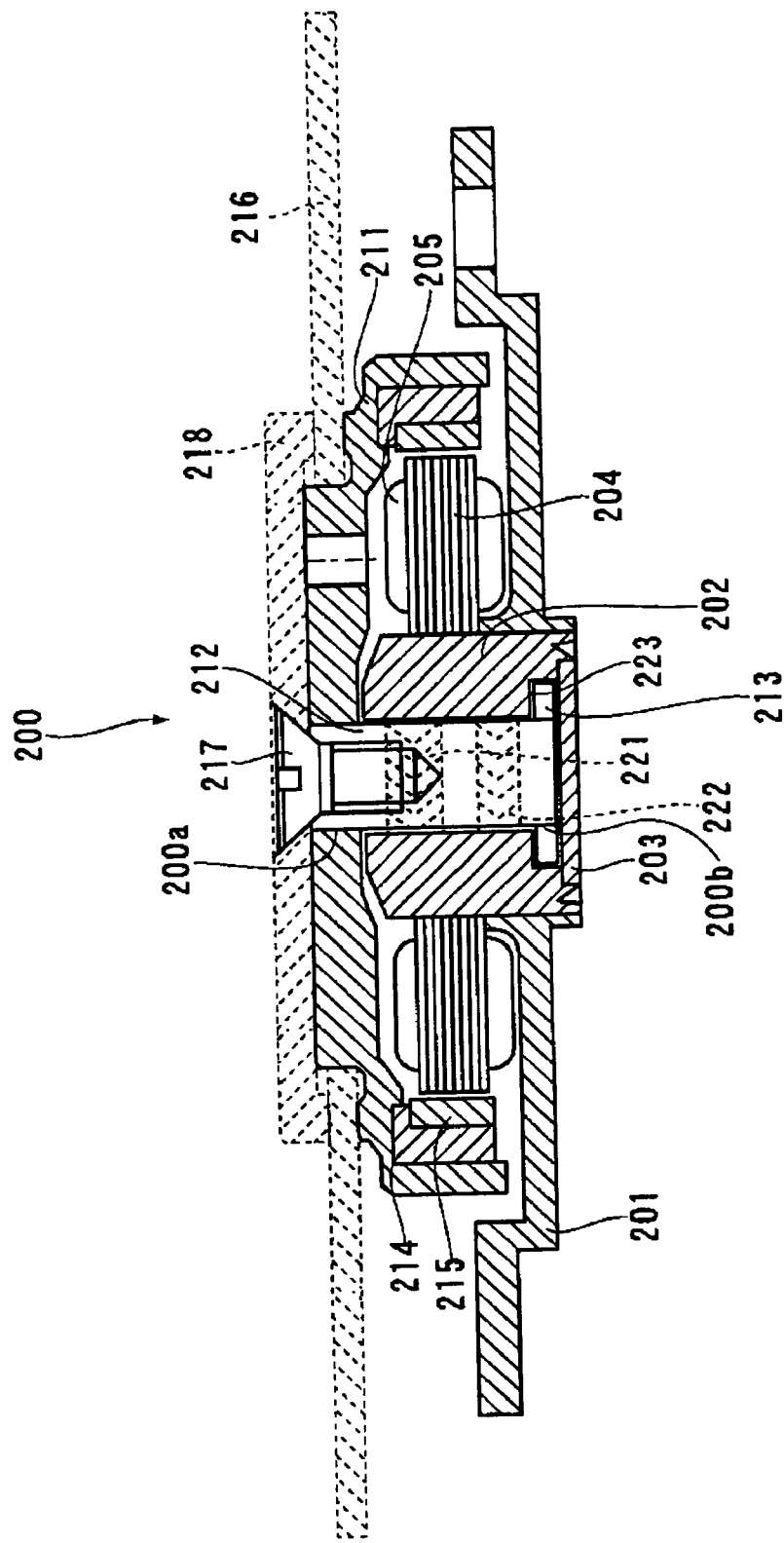
FIG. 20 is a sectional view showing the construction of a conventional shaft rotating type spindle motor.

FIG. 18 shows a modification of the spindle motor 70 of the third embodiment. A spindle motor 80 according to a modification of the spindle motor 70 of the third embodiment has a member 81 serving as both a base and a sleeve. The base/sleeve member 81 is formed as an integral member in which a base portion 82 corresponding to the base 1 and a sleeve portion 83 corresponding to the sleeve 11 are formed of an aluminum silicon alloy. As shown in FIG. 18(B), the base/sleeve member 81 has a rectangular wall portion 84, at the center of which the cylindrical sleeve portion 83 is arranged to extend vertically from the base portion 82. The base/sleeve member 81 can be obtained by forging an extrusion material obtained by the manufacturing method shown in FIG. 3.

Figure 3:
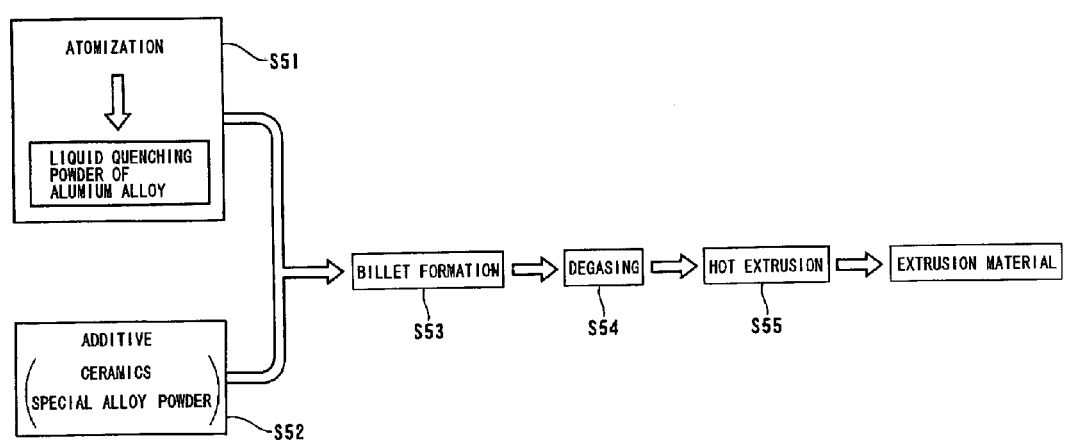
FIG. 3 is a diagram showing the steps of a manufacturing method for obtaining an aluminum silicon alloy constituting the material of an integral member formed by integrating the sleeve portion and the hub portion of the spindle motor of FIG. 1 with each other.

As the aluminum silicon alloy manufacturing method, it is also possible to adopt a method other than the one shown in FIG. 3. For example, there is a method in which an aluminum liquid quenching powder with a grain size of approximately 100 μm obtained by the atomization method and a silicon powder with a grain size of approximately several μm obtained by the atomization method or the like are mixed with each other and sintered into a predetermined configuration. In this case, the aluminum silicon body obtained by sintering includes approximately 5 to 10% of voids. Thus, it is also possible to further solidify this sintered body by forging to obtain a second integral member of an aluminum silicon alloy with a density of 100% in a predetermined configuration. In the case of the se/sleeve member 81 shown in FIG. 8(B), it is desirable to adopt a method in which the aluminum powder and the silicon powder are integrated by sintering into a shape akin to hat shown in FIG. 8(B), and then forged into the shape as shown in FIG. 8(B).

While in the spindle motor 80 the sleeve portion 83 and the base portion 82 are integrated, and further, the wall portion 84 constituting the case is also formed integrally of n aluminum silicon alloy, it is also possible to integrate the sleeve 11 and the base 1 alone or to integrate the sleeve 11 and the case when the base 1 is used as the case.

Further, while in the above-described embodiments and modifications a dynamic pressure groove is formed in the sleeve 11, and no dynamic pressure groove is formed in the shaft 2, it is also possible to use a sleeve formed of an SUS-400 type material and equipped with no dynamic pressure groove and to use a shaft formed of an aluminum silicon alloy according to the present invention equipped with a dynamic pressure groove, or to form both the sleeve and the shaft of an aluminum silicon alloy according to the present invention, forming a dynamic pressure groove in one of them. In the case in which both the sleeve and the shaft are formed of an aluminum silicon alloy according to the present invention, it is desirable for the respective coefficients of linear expansion to differ, with that of the sleeve being smaller.

Further, while in the above-described embodiments and modifications, the coefficient of linear expansion of the second integral member is $14 \times 10^{-6} \pm 5\%$ within the temperature range of 0° C. to 100° C., when the coefficient of linear expansion of the first integral member is $17 \times 10^{-6} \pm 5\%$ within the temperature range of 0° C. to 100° C., it is possible to achieve a considerable effect as compared with the prior art if the coefficient of linear expansion of the second integral member is $11 \times 10^{-6}$ to $15 \times 10^{-6}$ within the temperature range of 0° C. to 100° C. Further if the coefficient of linear expansion of the second integral member is $10 \times 10^{-6}$ to $16.5 \times 10^{-6}$ within the temperature range of 0° C. to 100° C., it is possible to achieve a sufficient effect as compared with the prior art. Further, while as a material whose coefficient of linear expansion is approximately $17 \times 10^{-6}$ within the temperature range of 0° C. to 100° C., an SUS-300 type material is preferable, it is also possible to adopt some other metal material, or a metal material only the surface of which is adjusted to this value through surface treatment.

Further, by forming the second integral member of a predetermined aluminum silicon alloy, it is possible to achieve a considerable hardness and a predetermined coefficient of linear expansion, and when its coefficient of linear expansion is smaller than the coefficient of linear expansion of the shaft 2 by $1 \times 10^{-6}$ to $7 \times 10^{-6}$ within the temperature range of 0° C. to 100° C., the bearing rigidity is stable when the gap size is several microns. As the minimum range of this range, it is possible to adopt $0.5 \times 10^{-6}$ or zero.

Further while in the above embodiments and modifications the higher the temperature the larger the value of the coefficient of linear expansion of the second integral member (in the case of T6 treatment, at a rate of approximately 0.15 to $0.2 \times 10^{-6}$ per 10° C.), it is also possible for the value of the rate to be some other value, or it is also possible for the change value to increase with temperature rise. Further, the coefficient of linear expansion of the second integral member may be a fixed value within the range of 0° C. to 100° C. ($10 \times 10^{-6}$ to $16.5 \times 10^{-6}$, more preferably, a specific value of approximately $11 \times 10^{-6}$ to $15 \times 10^{-6}$).

Further, while the thickness of the base portion of the hub 12 (the hub side portion of the connecting portion of the sleeve and the hub of the conventional motor) is substantially the same as the thickness of the disk 14 or approximately 1.3 times as large as the same, this may be made larger as long as it is within the range of 0.5 times or more and two times or less the thickness of the disk 14 placed, despite the fact that the integral rotation with the disk 14 is smoothened and that the thickness of the accommodating space S for the core 4 and the coil winding 5 is reduced. By increasing the accommodating space S, it is also possible to suppress the current loss.

Further, it is desirable for the axial thickness of the thrust plate 3 portion of the shaft 2 to be 0.1 to 0.7 mm, more preferably, 0.15 to 0.35 mm. This makes it possible to reduce the axial length of the motor while sufficiently satisfying the function of the thrust bearing, and it is possible to achieve a reduction in thickness and a substantial reduction in current loss. Further, in the above embodiments, the shaft side portion constituting the first integral member is formed of a material whose coefficient of linear expansion is fixed within the range of 0° C. to 100° C.; here, the expression "fixed" covers not only one undergoing no change at all but also ones whose change is approximately one fifth or less as compared with that of an aluminum silicon alloy.

Further, when a dynamic pressure generating substance whose viscosity undergoes no change with temperature changes is used, the respective coefficients of linear expansion of the shaft 2 and the second integral member may be the same. For example, when the shaft 2 is formed of an SUS-300 type material, the aluminum silicon alloy used may be one whose coefficient of linear expansion is approximately $17\times10^{-6}$, and when the shaft is formed of an SUS-400 type material, the aluminum silicon alloy used may be one whose coefficient of linear expansion is approximately $10\times10^{-6}$.

Further, as described above, instead of forming the shaft 2 and the thrust plate 3 in the spindle motor 10, 30, 40, 50, 70, and the dynamic pressure bearing device 60 as an integral member, it is also possible to form them of separate members, and assemble them into an integral unit. Further, when the sleeve 11 and the hub 12, or the sleeve 11 and the rotor, are formed as an integral member, and the member consists of an aluminum silicon alloy as used in the present invention, the coefficient of linear expansion of this aluminum silicon alloy (the second integral member) may be $10\times10^{-6}$ to $17\times10^{-6}$ within the measurement range of 0° C. to 100° C., which is not larger than the coefficient of linear expansion of the shaft 2.

Further, as described above, it is also possible to mix Al powder and Si powder with each other to form a raw material (with a density of approximately 95%) through sintering, and then form a blank of the same configuration as that of the second integral member by forging. It is also possible to use this blank as it is as the second integral member, or to perform machining, such as cutting, on it to form it into the second integral member. In a case in which the sintering process and forging are combined, the above-mentioned proportion is also adopted for the aluminum silicon alloy, whereby the above-mentioned effect over the prior art can be obtained; further, it is possible to adopt forging, which could not be adopted in the above embodiments due to the hardness of the material, can be adopted, making it possible to achieve an improvement in production efficiency and a reduction in cost.

Further, while the above embodiments and modifications employ an aluminum silicon alloy produced by adopting the atomization method, it is also possible to employ an aluminum silicon alloy produced by some other manufacturing method. In an aluminum silicon alloy obtained by the atomization method as adopted in the above embodiments and modifications, the cutting chips are in the form of a powder, which means it is a material that is very suitable for groove formation in a dynamic pressure bearing device. That is, in a dynamic pressure bearing device, in addition to thermal expansion and softness for groove formation, easiness of trimming (burr removal) on the swollen portion after groove formation is required; in the case of an aluminum silicon alloy produced by adopting the atomization method, this trimming is very easy to perform. This is due to the fact that the cutting chips at the time of burr removal are in the form of powder, so that the burr removal can be performed reliably and easily, and that no burr with an edged configuration is allowed to remain in the groove. Further, in the case of an aluminum silicon alloy obtained by the atomization method, it is possible to eliminate trimming (skim cutting) itself. This is because of the possibility of the aluminum silicon alloy having a characteristic such that, even in ball passing after trimming, there is no fear of the swollen portion entering (falling in) the groove.

Further, while the above-described embodiments and modifications are mainly applied to a spindle motor for HDD, they are also applicable to a spindle motor for other devices, such as an optical scanner. In such cases, one or both of the thrust plate 3 and the counter plate 13 may be eliminated.

In the case of a spindle motor other than a spindle motor for HDD, there is no portion corresponding to the hub 12, and the sleeve 11 and the rotor may be formed as an integral member. In this case, the entire rotor exclusive of the magnet may be integrated with the sleeve, or the rotor exclusive of the magnet and the back yoke may be integrated with the sleeve, or, further, the rotor potion exclusive of the portion to which the magnet and the back yoke are fixed and the portion in the vicinity thereof may be integrated with the sleeve; thus, various integration methods are available. Such modification can also be adopted in a spindle motor with a hub portion, such as a spindle motor for HDD.

Further, the dynamic pressure bearing device may also be one using, instead of oil, some other liquid or gas such as air. In particular, when air is utilized, it is possible to obtain a stable bearing rigidity even when the respective coefficients of linear expansion of the shaft 2 and the second integral member are the same.

INDUSTRIAL APPLICABILITY

According to the present invention, it is possible to achieve, in a dynamic pressure bearing device and a spindle motor, an improvement in impact resistance, a reduction in A-RRO (so-called shaft oscillating motion), a reduction in the variation in bearing rigidity with respect to temperature changes; further, it is possible to suppress current loss and to achieve a reduction in size and thickness. Thus, it is possible to achieve an improvement in quality and a reduction in size and thickness for a device using the above dynamic pressure bearing device or spindle motor, such as a disk drive device with a spindle motor mounted therein. Further, according to another aspect of the invention, it is possible to obtain a dynamic pressure bearing device, a spindle motor, and a disk drive device with a spindle motor mounted therein, which provide part of the above-described effects of the present invention and other effects.

While the present invention has been particularly shown and described in conjunction with a preferred embodiment thereof, it will be readily appreciated by those of ordinary skill in the art that various changes may be made without departing from the spirit and scope of the invention. Therefore, it is intended that the appended claims be interpreted as including the embodiments described herein, the alternatives mentioned above, and all equivalents thereto.

The invention claimed is:

1. A dynamic pressure bearing device comprising a base, a shaft fixed to the base, and a sleeve rotatably arranged around the shaft, characterized in that:
   a circular thrust plate, which is provided on the shaft and has a diameter larger than that of the shaft portion, and the shaft are formed integrally of a stainless steel into a shaft member;
   the sleeve is formed of an aluminum silicon alloy containing aluminum and silicon as components, the sleeve having an inner diameter ranging from 0.6 to 3 mm;
   the shaft member has a coefficient of linear expansion of $17\times10^{-6}\pm5\%$;
   the sleeve has a coefficient of linear expansion of $14\times10^{-6}\pm5\%$ as measured in a measurement range of 0° C. to 100° C.;
   a thrust plate portion has an axial thickness of 0.15 to 0.35 mm;
   a hardness of the sleeve is lower than that of the shaft, with a radial bearing dynamic pressure groove being provided in a portion of the sleeve, which is a softer member, opposed to the shaft; and
   a counter plate is provided at a position opposed to the thrust plate so as to cover the thrust plate and to close a central hole of the sleeve, a first thrust dynamic pressure groove for a thrust bearing is provided at a position of the counter plate opposed to the thrust plate, and a second thrust dynamic pressure groove is provided in a portion of the sleeve opposed to a surface opposite to the surface of the thrust plate opposed to the first thrust dynamic pressure groove.

2. A dynamic pressure bearing device comprising a shaft, a sleeve provided around the shaft so as to be capable of relative rotation, and a base to which one of the shaft and the sleeve is fixed, characterized in that:
    the shaft is formed of a stainless steel;
    the sleeve is formed of an aluminum silicon alloy containing aluminum and silicon as components;
    the shaft has a coefficient of linear expansion of $17 \times 10^{-6} \pm 5\%$;
    the sleeve has a coefficient of linear expansion of $11 \times 10^{-6}$ to $16.5 \times 10^{-6}$ as measured in a measurement range of 0° C. to 100° C.; and
    a hardness of the sleeve is lower than that of the shaft, with a dynamic pressure groove for a radial bearing being provided in a portion of the sleeve, which is a softer member, opposed to the shaft.

3. A dynamic pressure bearing device comprising a shaft, a sleeve provided around the shaft so as to be capable of relative rotation, and a base to which one of the shaft and the sleeve is fixed, characterized in that:
    the sleeve is formed of an aluminum silicon alloy containing 65 to 69% by weight of Al, 28 to 32% by weight of Si, and 1 to 5% by weight of Cu, etc., the sleeve having a coefficient of linear expansion smaller than that of the shaft by $0.5 \times 10^{-6}$ to $7 \times 10^{-6}$, the sleeve having a hardness lower than that of the shaft, and a dynamic pressure groove for a radial bearing is provided in a portion of the sleeve, constituting a softer member, opposed to the shaft.

4. A dynamic pressure bearing device comprising a shaft, a sleeve provided around the shaft so as to be capable of relative rotation, and a base to which one of the shaft and the sleeve is fixed, characterized in that:
    the shaft is equipped with a thrust plate;
    the sleeve is formed of an aluminum silicon alloy containing aluminum and silicon as components;
    the shaft is formed of a stainless steel made of an iron type alloy containing 10.5 to 32% by weight of Cr and 4 to 13% by weight of Ni; and
    a dynamic pressure groove for a radial bearing is provided in an inner peripheral surface of the sleeve which is a portion of the sleeve opposed to the shaft, a first thrust dynamic pressure groove for a thrust bearing is provided at a position of a counter plate opposed to the thrust plate, the counter plate being provided at a position opposed to the thrust plate so as to cover the thrust plate and to close a central hole of the sleeve, and a second thrust dynamic pressure groove is provided in a portion of the sleeve opposed to a surface opposite to the surface of the thrust plate opposed to the first thrust dynamic pressure groove.

5. A dynamic pressure bearing device comprising a shaft, a sleeve provided around the shaft so as to be capable of relative rotation, and a base to which one of the shaft and the sleeve is fixed, characterized in that:
    the sleeve is formed of an aluminum silicon alloy containing aluminum and silicon as components and increasing in coefficient of linear expansion with temperature rise at least in a range of 0° C. to 100° C., the shaft having a coefficient of linear expansion larger than the coefficient of linear expansion of the sleeve and constant within the temperature range, the sleeve having a hardness lower than a hardness of the shaft, and a dynamic pressure groove for a radial bearing is provided in a portion of the sleeve, constituting a softer member, opposed to the shaft.

6. A dynamic pressure bearing device according to any one of claims 2, 3, 4, and 5, characterized in that the inner diameter of the sleeve ranges from 0.6 to 3 mm.

7. A spindle motor comprising a base, a shaft fixed to the base, a sleeve rotatably arranged around the shaft, a hub or a rotor adapted to rotate integrally with the sleeve, and a stator fixed to the base, characterized in that:
    a circular thrust plate, which is provided on the shaft and has a diameter larger than that of the shaft portion, and the shaft are formed integrally of a stainless steel as a first integral member;
    the sleeve and the hub, or the sleeve and the rotor, are formed integrally as a second integral member of an aluminum silicon alloy containing aluminum and silicon as components, the sleeve having an inner diameter ranging from 0.6 to 3 mm;
    the first integral member has a coefficient of linear expansion of $17 \times 10^{-6} \pm 5\%$;
    the second integral member has a coefficient of linear expansion of $14 \times 10^{-6} \pm 5\%$ as measured in a measurement range of 0° C. to 100° C.;
    the second integral member has a lower hardness than the first integral member, with a radial bearing dynamic pressure groove being provided in a portion of the second integral member, constituting a softer member, opposed to the shaft; and
    a counter plate is provided at a position opposed to the thrust plate so as to cover the thrust plate and to close a central hole of the sleeve, a first thrust dynamic pressure groove for a thrust bearing is provided at a position of the counter plate opposed to the thrust plate, and a second thrust dynamic pressure groove is provided in a portion of the sleeve opposed to a surface opposite to the surface of the thrust plate opposed to the first thrust dynamic pressure groove.

8. A spindle motor comprising a base, a shaft fixed to the base, a sleeve rotatably arranged around the shaft, a hub or a rotor adapted to rotate integrally with the sleeve, and a stator fixed to the base, characterized in that:
    the shaft is formed of a stainless steel;
    the sleeve and the hub, or the sleeve and the rotor, are formed integrally as an integral member of an aluminum silicon alloy containing aluminum and silicon as components;
    the shaft has a coefficient of linear expansion of $17 \times 10^{-6} \pm 5\%$;
    the integral member has a coefficient of linear expansion of $11 \times 10^{-6}$ to $15 \times 10^{-6}$ as measured in a measurement range of 0° C. to 100° C.; and
    a hardness of the integral member is lower than that of the shaft, with a dynamic pressure groove for a radial bearing being provided in a portion of the integral member, which is a softer member, opposed to the shaft.

9. A spindle motor comprising a base, a shaft fixed to the base, a sleeve rotatably arranged around the shaft, a hub or a rotor adapted to rotate integrally with the sleeve, and a stator fixed to the base, characterized in that:
    the sleeve and the hub, or the sleeve and the rotor, are formed integrally as an integral member of an aluminum silicon alloy containing 65 to 69% by weight of Al, 28 to 32% by weight of Si, and 1 to 5% by weight of Cu, etc., the integral member having a coefficient of linear expansion smaller than that of the shaft by $1\times10^{-6}$ to $7\times10^{-6}$, the integral member having a hardness lower than that of the shaft, and a dynamic pressure groove for a radial bearing is provided in a portion of the integral member, constituting a softer member, opposed to the shaft.

10. A spindle motor comprising a base, a shaft fixed to the base, a sleeve rotatably arranged around the shaft, a hub or a rotor adapted to rotate integrally with the sleeve, and a stator fixed to the base, characterized in that:

the shaft is equipped with a circular thrust plate;

the sleeve and the hub, or the sleeve and the rotor, are formed of an aluminum silicon alloy containing aluminum and silicon as components;

the shaft is formed of a stainless steel made of an iron type alloy containing 10.5 to 32% by weight of Cr and 4 to 13% by weight of Ni; and a dynamic pressure groove for a radial bearing is provided in an inner peripheral surface of the sleeve which is a portion of the sleeve opposed to the shaft, a first thrust dynamic pressure groove for a thrust bearing is provided at a position of a counter plate opposed to the thrust plate, the counter plate fixed to the hub or the rotor, and being provided at a position opposed to the thrust plate so as to cover the thrust plate and to close a central hole of the sleeve, and a second thrust dynamic pressure groove is provided in a portion of the sleeve opposed to a surface opposite to the surface of the thrust plate opposed to the first thrust dynamic pressure groove.

11. A spindle motor comprising a base, a shaft fixed to the base, a sleeve rotatably arranged around the shaft, a hub or a rotor adapted to rotate integrally with the sleeve, and a stator fixed to the base, characterized in that:

the sleeve and the hub, or the sleeve and the rotor, are formed integrally as an integral member of an aluminum silicon alloy containing aluminum and silicon as components and increasing in coefficient of linear expansion with temperature rise at least in a range of 0° C. to 100° C., the shaft having a coefficient of linear expansion larger than the coefficient of linear expansion of the integral member and constant within the temperature range, the integral member having a hardness lower than a hardness of the shaft, and a dynamic pressure groove for a radial bearing is provided in a portion of the integral member, constituting a softer member, opposed to the shaft.

12. A spindle motor comprising a shaft, a sleeve arranged around the shaft so as to be capable of relative rotation, a hub or a rotor adapted to rotate integrally with the sleeve, and a base to which one of the sleeve and the shaft is fixed, characterized in that:

a circular thrust plate, which is provided on the shaft and has a diameter larger than that of the shaft, and the shaft are formed integrally into an integral member of a stainless steel, with a thrust plate portion of the integral member having an axial thickness of 0.1 to 0.7 mm.

13. A spindle motor comprising a shaft, a sleeve arranged around the shaft so as to be capable of relative rotation, a hub or a rotor adapted to rotate integrally with the sleeve, and a base to which one of the sleeve and the shaft is fixed, characterized in that:

the sleeve and the hub, or the sleeve and the rotor, are formed integrally into an integral member of an aluminum silicon alloy containing aluminum and silicon as components;

the integral member has a coefficient of linear expansion of $10\times10^{-6}$ to $17\times10^{-6}$ and not larger than a coefficient of linear expansion of the shaft; and a hardness of the integral member is not higher than that of the shaft, with a dynamic pressure groove for a radial bearing being provided in a portion of the integral member, which is a member of an equivalent or higher softness, opposed to the shaft.

14. A spindle motor comprising a shaft, a sleeve arranged around the shaft so as to be capable of relative rotation, a hub or a rotor adapted to rotate integrally with the sleeve, and a base to which one of the sleeve and the shaft is fixed, characterized in that:

a circular thrust plate provided on the shaft and the shaft are integrally formed into a first integral member of a stainless steel;

the sleeve and the hub, or the sleeve and the rotor, are formed integrally into a second integral member of an aluminum silicon alloy containing aluminum and silicon as components;

the second integral member has a coefficient of linear expansion of $10\times10^{-6}$ to $17\times10^{-6}$ as measured in a measurement range of 0° C. to 100° C. and not larger than a coefficient of linear expansion of the first integral member; and a hardness of the second integral member is not higher than that of the first integral member, with a dynamic pressure groove for a radial bearing being provided in a portion of the second integral member, which is a member of an equivalent or higher softness, opposed to the shaft.

15. A spindle motor comprising a shaft, a sleeve arranged around the shaft so as to be capable of relative rotation, a hub or a rotor adapted to rotate integrally with the sleeve, and a base to which one of the sleeve and the shaft is fixed, characterized in that:

the sleeve and the hub, or the sleeve and the rotor, are formed integrally as an integral member of an aluminum silicon alloy containing 65 to 84% by weight of Al, 15 to 32% by weight of Si, and 1 to 5% by weight of Cu, etc., the integral member having a coefficient of linear expansion smaller than that of the shaft by $0\times10^{-6}$ to $7\times10^{-6}$, the integral member having a hardness not higher than that of the shaft, and a dynamic pressure groove for a radial bearing is provided in a portion of the integral member, constituting a member of an equivalent or higher softness, opposed to the shaft.

16. A spindle motor comprising a shaft, a sleeve arranged around the shaft so as to be capable of relative rotation, a hub or a rotor adapted to rotate integrally with the sleeve, and a base to which one of the sleeve and the shaft is fixed, characterized in that:

the sleeve is formed of an aluminum silicon alloy containing 65 to 84% by weight of Al, 15 to 32% by weight of Si, and 1 to 5% by weight of Cu, etc., the sleeve having an inner diameter ranging from 0.6 to 3 mm.

17. A disk drive device which adopts the spindle motor as claimed in any one of claims 7 through 16 as a drive mechanism for rotating a disk.

* * * * *